United States Patent [19]

Lemson

[11] Patent Number: 5,655,217

[45] Date of Patent: *Aug. 5, 1997

[54] SPECTRUM SHARING COMMUNICATIONS SYSTEM FOR MONITORING AVAILABLE SPECTRUM

[75] Inventor: Paul Hendrick Lemson, St. Louis, Mo.

[73] Assignee: Southwestern Bell Technology Resources, Inc., St. Louis, Mo.

[*] Notice: The term of this patent shall not extend beyond the expiration date of Pat. No. 5,548,809.

[21] Appl. No.: 462,686

[22] Filed: Jun. 5, 1995

Related U.S. Application Data

[63] Continuation of Ser. No. 913,341, Jul. 15, 1992.

[51] Int. Cl.$^6$ .................................................. H04Q 7/34
[52] U.S. Cl. ........................ 455/513; 455/62; 455/67.3; 455/67.5; 455/450
[58] Field of Search .................... 455/33.1, 33.2, 455/33.4, 34.1, 34.2, 50.1, 53.1, 54.1, 56.1, 62, 63, 67.1, 67.3, 67.5; 379/59, 58, 60

[56] References Cited

U.S. PATENT DOCUMENTS

| | | | |
|---|---|---|---|
| 4,872,205 | 10/1989 | Smith | 455/58.1 |
| 5,067,147 | 11/1991 | Lee | 379/60 |
| 5,093,927 | 3/1992 | Shanley | 455/62 |
| 5,142,691 | 8/1992 | Freeburg et al. | 455/38.2 |
| 5,276,908 | 1/1994 | Koohgoli et al. | 455/62 X |
| 5,355,522 | 10/1994 | Demange | 455/56.1 X |
| 5,410,737 | 4/1995 | Jones | 455/62 X |
| 5,412,658 | 5/1995 | Arnold et al. | 455/62 X |
| 5,428,819 | 6/1995 | Wang et al. | 455/34.1 |

FOREIGN PATENT DOCUMENTS

| | | |
|---|---|---|
| 2051866 | 4/1992 | Canada. |
| 2255476 | 11/1992 | United Kingdom. |
| 9208324 | 5/1992 | WIPO. |

OTHER PUBLICATIONS

United Kingdom Search Report, issued on Sep. 30, 1993.

"American Personal Communications KC2XDM, FCC File No. 2056–EX–ML–91 Seventh Progress Report," filed with the Federal Communications Commission, Office of the Secretary, on Apr. 28, 1992.

"Third Report And Order" an Amendment of the Commission's Rules to Establish New Personal Communications Services, released by the Federal Communications Commission, Feb. 3, 1994.

Telocator Spectrum Sharing Report, "An Overview of Spectrum Sharing Technologies for the Emerging Technologies Band, " Telocator PCS Technical and Engineering Subcommittee, TEAC/92–5–26/018.

Cellular Mobile Telephone System CME 20 System Description, Ericsson Radio System AB, S–16480, Stockholm Sweden.

(List continued on next page.)

Primary Examiner—Reinhard J. Eisenzopf
Assistant Examiner—Philip J. Sobutka
Attorney, Agent, or Firm—Greenblum & Bernstein P.L.C.

[57] ABSTRACT

A mobile radio communications network is provided with a system for allocating one or more ranges of transmission frequency to the communications network, in order to prevent the network from interfering with received signals of an incumbent radio system. The allocating system may be provided with a device for receiving and monitoring information indicative of the presence and location of incumbent radio stations. A signal level monitoring system monitors signals transmitted from incumbent radio stations to determine the frequency and degree of RF isolation, with respect to a monitoring antenna of the monitoring system, of the stations. The monitoring system includes monitoring antennas, a spectrum analyzer, a device for controlling the spectrum analyzer, and a device for processing and correcting the data produced by the spectrum analyzer.

12 Claims, 18 Drawing Sheets

OTHER PUBLICATIONS

American Personal Communication, Inc. Petition for Rule Making, before the Federal Communication Commission, Washington, D.C., 20554, filed May 3, 1991, with Attachment A.

American Personal Communication, Inc. Application for New or Modified Radio Station Authorization, before the Federal Communication Commission, Washington, D.C., 20554, filed May 3, 1990.

American Personal Communication, Inc. KC2X2M, FCC, File No. 2056–EX–ML–91, Seventh Quarterly Progress Report to Federal Communication Commission, Office of the Secretary, filed Apr. 28, 1992.

B. K. Johnson et al., "Simulation Study of Spectrum Sharing Between Microwave Links and Personal Communications System," Motorola, Inc.

EIA/TIA Telecommunications Systems Bulletin, Interference Criteria for Microwave Systems in the Private Radio Services, TSB10–E, Nov., 1990.

Telocator Bulletin, Apr. 17, 1992, pp. 3–4.

"APC Demonstrates Fast System by Completing PCS Phone Call in 1850–1990 MHz Band; Company Files Supplemental Rulemaking Petition Proposing Spectrum, Licensing Schemes, " Telecommunications Reports (May 11, 1992), pp. 1–4.

CCIR Study Group Draft New Report, Sharing Considerations Between the Fixed Services and the Mobile Services near 2 GHz, Document 9D/TEMP/8–e (Jun. 21, 1991).

Biographical Sketch for Donald C. Cox and FCC En Banc Hearing on PCS—Remarks of Dr. Donald C. Cox (Dec. 5, 1991).

Telecommunications Reports Wireless News, vol. 2, No. 8 (Apr. 23, 1992), pp. 1–7.

Advance Wireless Communications, vol. 2, No. 16 (Aug. 7, 1991), pp. 1–9.

Telocator Bulletin (Jun. 14, 1991) pp. 4–5.

Telocator Bulletin (Jul. 26, 1991) p. 5.

American Personal Communications KC2XDM, FCC File No. 2056–EX–ML–91 Fifth Progress Report submitted to the FCC on Oct. 28, 1991.

Microcell News, Probe Research, Inc., vol. 3, No. 10 (Apr. 25, 1992) pp. 1, 5–6.

The Spectrum Report, May 13, 1992, p. 8.

P. Lemson, FPLMTS–Intelligent Multiple Access Spectrum Sharing (IMASS), document submitted to CCIR TG 8/1–USA (Sep. 13, 1991).

Southwestern Bell Personal Communications, Inc. Application for Experimental Authorization to construct and Operate a Personal Communications Network Within the Vicinity of Houston, TX., Submitted to the Federal Communication Commission, Washington D.C. on Jul. 16, 1991.

American Personal Communications, Inc. Request for a Pioneer's Preference, submitted before FCC on Jul. 30, 1991.

Cover Sheet, EIA/TIA Interim Standard, "Cellular Radio Telecommunications Intersystem Operations: Functional Overview," EIA/TIA/IS–41.1–b (Dec. 1991).

HP 8594A RF Spectrum Analyzer 9kHz to 2.9 GHz, Technical Data.

Southwestern Bell Personal Communications, Inc. Second Quarterly Progress Report, File No. 2195–EX–PL–91 (Sep. 1992).

Telocator Bulletin, vol. 92, No. 34, p. 12 (Sep. 4, 1992).

Quarterly Progress Report No. 1 in Connection with a Personal Communications Experiment Conducted in the Vicinity of Houston, TX, by Southwestern Bell Personal Communications, Inc., Jun. 17, 1992.

American Personal Communications, Inc. Petition for Amendment of the Commission's Rule, submitted before the FCC (Suplement to Petition for Rulemaking), filed May 4, 1992.

"Southwestern Bell Plans to Test PCN Spectrum Sharing," (pulication and date unknown).

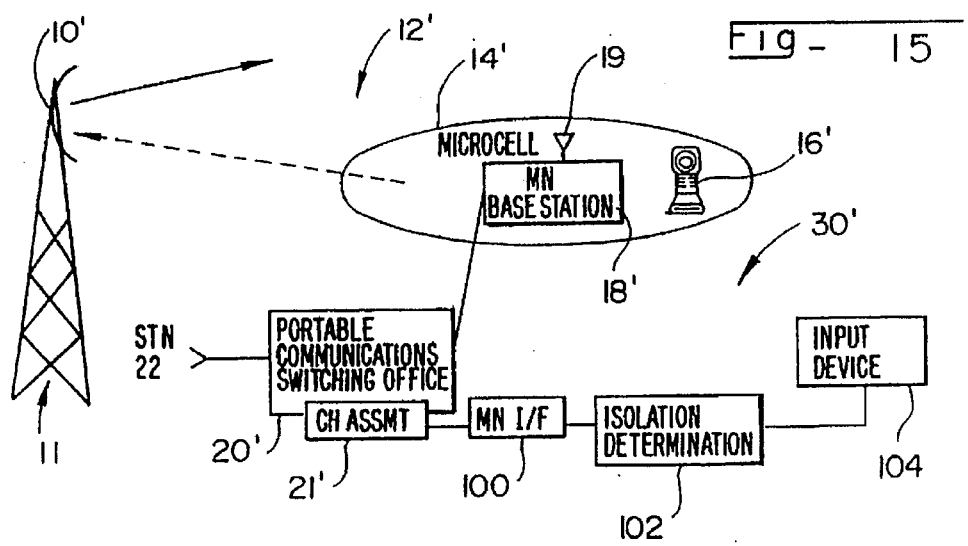
Fig - 15
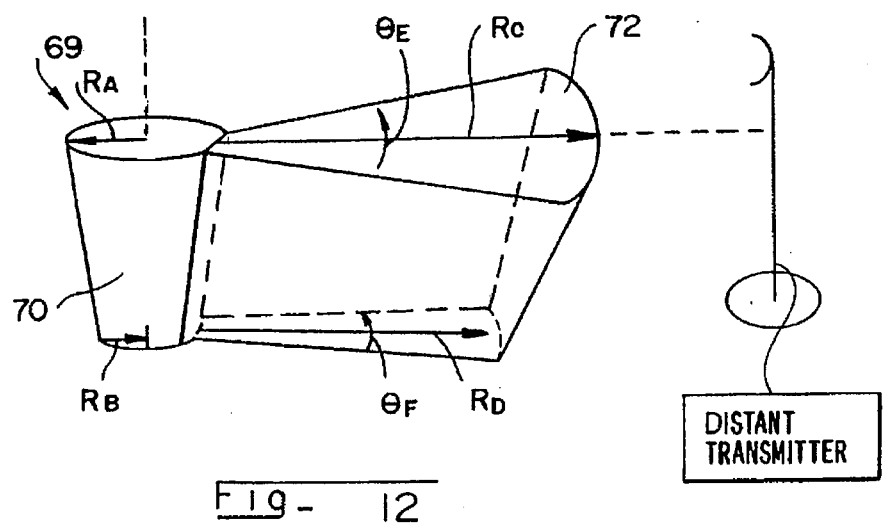
Fig - 12
Fig - 14

SPECTRUM SHARING COMMUNICATIONS SYSTEM FOR MONITORING AVAILABLE SPECTRUM

This application is a continuation, of pending application Ser. No. 07/913,341 filed Jul. 15, 1992.

FIELD OF THE INVENTION

The present invention relates to a radio communications network which shares (i.e., transmits and/or receives signals within) the frequency space of an incumbent radio system, and a system for monitoring for the availability of frequency space. More particularly, the present invention is directed to a radio communications system which includes a radio communications frequency allocation control system, a mobile communications network, and a signal level monitoring system. The radio communications frequency allocation control system allocates one or more ranges of transmission frequency to the mobile communications network, without impinging on the operation of an incumbent radio system. The signal level monitoring system monitors the levels of signals transmitted by an incumbent radio system, in order to determine the availability of one or more ranges of transmission frequency.

DISCUSSION OF BACKGROUND INFORMATION

In several of its more specific embodiments and aspects, the present invention is related to mobile cellular radio systems, and more particularly to microcellular radio systems (intended for slow-moving, rather than vehicular, users). One of the objects of the present invention, in one or more of its particular aspects, is to provide a mechanism by which a microcellular radio system may utilize radio channels which are also assigned to fixed radio systems, such as point-to-point systems (e.g., Private Operational Fixed Microwave—POFM).

While several countries, including the United Kingdom, and other countries in Europe and Asia, have each reserved an exclusive spectrum for implementation of the next generation of wireless Personal Communications Services (PCS), the United States has not reserved such a clear and unassigned spectrum for PCS. In the United States, incumbent radio systems such as POFM have already been assigned use of certain portions of the frequency spectrum (between 1850 and 2200 MHz), and accordingly restrain the ability to implement and thus utilize emerging PCS technologies.

New techniques have been proposed for facilitating the operation of low-power microcellular networks which will share frequency bands now being used by existing radio services. Four basic approaches have been proposed to facilitate such spectrum sharing with incumbent radio systems. A first approach, known as geographically coordinated sharing, is an adaptation of a known microwave link coordination technique, employed by terrestrial point-to-point microwave system designers. With this approach, computer models are utilized to determine inter-link interference from information concerning terrain scattering (e.g., trees and buildings), signal propagation, and antenna patterns.

A second approach, known as "geographical avoidance," operates based upon the presumption that a microwave receiver will not encounter interference from low power terminals transmitting on the same channel if those terminals utilize a level of power which is sufficiently low, and if the terminals are located far enough away from the microwave receiver sites. Significant amounts of information concerning the physical dimensions of nearby objects and complex computer-aided radio propagation modeling techniques must be utilized in order to employ this approach, and preferred propagation models used in conjunction with the geographical avoidance technique do not give an accurate picture of available microwave channels (and thus fail to provide the optimal reclamation of microwave channels which could be utilized by the mobile communications system).

A third spectrum sharing approach utilizes wideband modulation techniques, so that a low-power mobile communications system will occupy a much wider bandwidth than a higher power incumbent radio system. One example implementation of such a spectrum sharing approach utilizes a Wideband Direct Sequence Code Division Multiple Access (CDMA) spectrum overlay with a lower power level per microwave channel, in which a transmitted signal of the mobile system is spread over five microwave channels of the incumbent system, thus reducing the per-channel power by 7 dB as compared with narrow band approaches. By utilizing this technique, the size of each exclusion zone for any one microwave channel will be reduced by a factor of nearly two, assuming free-space (i.e., no shadowing) propagation. The disadvantages of this approach include the additional complexity required for each handheld terminal of the mobile communications system, and the likelihood that unwanted intersystem interference (mobile-to-fixed and fixed-to-mobile) will inevitably result in areas where there is a high density of fixed microwave systems. Moreover, there is evidence to suggest that ten PCN transmitters which employ Wideband Direct Sequence CDMA, each having a 1 mW output power and being located 2 miles from a fixed microwave site, can substantially degrade the performance of a fixed point-to-point microwave receiver. Evidence also suggests that a single PCN user, at up to 12 miles away from a fixed microwave receiver site, could potentially interfere with a fixed microwave link. See page 8 of Prabhu, V. K., "Some Considerations of Frequency Sharing Between Fixed Service and Personal Communications Network," Report to FCC Regarding GEN. Docket 90-314, Oct. 1, 1990.

In a fourth approach to spectrum sharing, adaptive notch filters are provided in mobile radio terminals which employ Wideband Direct Sequence CDMA. The notch filters each reduce or eliminate the strength of signals within a specified frequency band which are transmitted by the radio terminal. The mobile communications network controls the terminals to tune each notch filter to a particular channel, to thus prevent harmful interference to a nearby fixed microwave receiver tuned to that channel. One significant disadvantage associated with this approach is the additional costs associated with incorporating the adaptive filters in each handheld terminal, and the added complexity of coordinating the operation of the adaptive filters. In addition, the number of mobile radio terminals which can transmit at a given location is determined based on the closest microwave site of those which use any of the microwave channels over which the PCN signal is spread. Accordingly, in a dense environment of fixed microwave usage, Wideband Direct Sequence CDMA mobile communications systems will likely require larger exclusion zones than Narrowband mobile systems.

DEFINITIONS

For purposes of clarification, and to assist readers in an understanding of the present invention, a number of terms used herein are defined as follows (a number of variables used throughout this application are detailed at Tables 1–3 of this application):

Incumbent Radio System: A system having access to a portion of the frequency spectrum shared in common with another radio communications system, in that the other radio communications system will cede use of the spectrum to the incumbent radio system under specified circumstances.

PCS (Personal Communications Services): Services which may include a broad range of person-centered telecommunications services which are independent of the media used for delivery and oriented toward a person, rather than a location.

PCN (Portable Communications Network): A network which delivers PCS through personalized light weight radio communications terminals.

Spectrum Analyzer: A system which measures signal levels within specified frequency bands, to produce a plurality of signal values corresponding to those signal levels.

A Co-Located Receiver (Transmitter): A receiver (transmitter) associated with a transmitter (receiver), wherein one or a plurality of antennas utilized by each of the receiver and transmitter are in close proximity to one another, or are one and the same.

Ancillary Communications Network: A communications network which is radio-based, at least in part, and which will cede use of a portion of the frequency spectrum, shared in common with an incumbent radio system, to the incumbent radio system under specified circumstances.

SUMMARY OF THE INVENTION

In view of the above, the present invention, through one or more of its various aspects and/or embodiments, is thus presented to bring about one or more objects and advantages, such as those noted below.

It is an object of the present invention to provide a radio communications network which shares a portion of the frequency spectrum with incumbent radio systems, such as fixed point-to-point microwave radio systems.

It is a further object of the present invention to implement a radio communications network, and avoid harmful interference to incumbent radio systems while implementing the same. Meanwhile, it is an object to give the network a maximum amount of access to the spectrum without interfering with the incumbent systems, e.g., with a minimum of undesirable or excessive interference with such systems.

It is a further object of the present invention to provide a spectrum sharing Personal or Portable Communications Network (PCN) which has a defined, but flexible, protocol which may be implemented with several available technologies.

It is an additional object of the invention to provide a spectrum sharing system which will operate in an environment where there are terrestrial microwave transmitters nearby and which is compatible with known multiple access communications systems and a majority of evolving PCN technologies.

It is an additional object of the invention to provide a spectrum sharing system that employs capabilities inherent to conventional and evolving cellular and microcellular communications systems, including semi-fixed and adaptive frequency assignment, base station controlled and mobile-assisted handoff, and frequency agile subscriber terminals.

It is a further object of the present invention to accommodate multiple service providers in a given area within a single incumbent system microwave channel, for environments where the density of incumbent microwave system frequency use is extremely high.

It is yet an additional object of the present invention to provide a measurement-based spectrum sharing system for identifying frequency band segments which correspond to receivers of an incumbent radio system having sufficient RF isolation from transmitters of an additional communications system.

It is yet a further object of the present invention to provide a spectrum sharing system which executes automatic and dynamic spectrum coordination between incumbent microwave users and PCN users through the use of open and standard PCN control interfaces.

It is a further object of the present invention to provide a system which (unlike Wideband Direct Sequence CDMA approaches, which spread a low-power mobile radio signal over several microwave channels of incumbent radio systems) will not transmit any signals within microwave channels utilized by certain nearby microwave receivers of incumbent radio systems. An additional object of the invention is to provide a frequency spectrum sharing system which will accommodate multiple mobile communications system providers in the same geographical area, who must share a common block of spectrum.

It is a further object of the present invention to utilize a three-dimensional exclusion zone based on the individual path characteristics of simplex POFM paths, thus also preventing interference of simplex POFM (Private Operational Fixed Microwave), in addition to duplex point-to-point fixed microwave systems.

It is a further object of the present invention to provide a measurement system which can determine the likelihood that a radio communications system will interfere with an incumbent microwave system by utilizing a transmitter of the incumbent system which is co-located with a receiver as a "beacon" to help determine the degree of RF isolation between the low-power mobile network and the receiver antenna of the fixed microwave system, thus identifying what spectrum is available for use by the mobile network. In this approach, a disadvantage associated with previous systems is eliminated. The measurement system can compensate for higher fixed microwave receiver antenna gains in estimating the degree of RF isolation between a mobile network and a fixed microwave site, since signals transmitted by the co-located transmitter will be received with a higher signal strength.

The present invention, therefore, is directed to a spectrum sharing communications network and system for monitoring available spectrum. In a particular aspect of the invention, a radio communications frequency allocation control system is provided which allocates one or more ranges of transmission frequency to an ancillary communications network. The network comprises a plurality of ancillary radio stations, and the ranges of frequency are allocated in order to prevent one or more of the ancillary radio stations from interfering with received signals of an incumbent radio system which shares frequency space with the ancillary communications network.

The control system includes a device for receiving and monitoring information indicative of the presence and location of an incumbent radio system, wherein the information includes a plurality of levels and frequencies of radio signals which are located within the frequency range of the incumbent radio system. In addition, a device is provided for processing the information into a form more closely representative of the actual presence and location of the incumbent station; and a device is provided which is responsive to the processing device for allocating one or more frequency ranges within which the mobile communications network can transmit signals without excessively interfering with the received signals of the incumbent radio system.

In accordance with a particular aspect of the invention, the receiving and monitoring device includes a device for periodically measuring levels of signals across an entire frequency band of interest utilized by the ancillary communications network. The periodic measuring device comprises a device for synchronizing assignment of the ancillary communications network transmission frequencies, so that the periodic measuring device will not measure signals which include signals transmitted from the ancillary communications network.

In accordance with another aspect of the invention, a radio communications frequency allocation control system is provided which allocates one or more ranges of transmission frequency to an ancillary (e.g., mobile) communications network. The ranges of transmission frequency are allocated in order to prevent one or more of a plurality of ancillary radio stations of the ancillary communications network from interfering with received signals of an incumbent radio system which shares frequency space with the ancillary communications network, and which comprises one or more incumbent radio stations. It includes a device for obtaining information which represents one or more incumbent radio stations, which information includes a plurality of signal level values and corresponding frequency values obtained from radio signals within the frequency range of the incumbent radio system; and a device for processing the information into a form more closely representative of the actual presence and location of the incumbent radio stations. A device is provided for receiving data regarding the availability of frequency ranges within which the ancillary communications network can communicate without interfering with the incumbent radio system. In addition, a device, which is responsive to the receiving device, is provided for allocating one or more frequency ranges within which the ancillary communications network can transmit signals without interfering with the received signals of the incumbent radio system.

In another aspect of the invention, a mobile communications network is provided. The network includes at least one base station, and at least one user terminal capable of transmitting and receiving signals to and from the base station. The signals are transmitted and received within a frequency band which is narrower than a channel of an incumbent radio system which shares frequency spectrum with the mobile communications network. A device is provided which assigns frequencies on which the user terminal transmits and receives the signals; at least a portion of the frequency assigning device is located at the base station. In addition, a device is provided for receiving parameters representative of ranges of frequencies which can be assigned by the frequency assigning device. The parameters comprise an available channels list, and the apparatus includes means for controlling the frequency assigning means to only assign frequencies listed in the available channels list.

In accordance with another aspect of the present invention, a signal level monitoring system is provided. The system includes monitoring antennas, a spectrum analyzer, a control device, and a processing device. The spectrum analyzer, which is coupled to the monitoring antennas, produces data representative of a signal level contained within at least one frequency band received by each of the antennas. A control device controls the spectrum analyzer, and a processing device processes the data produced by the spectrum analyzer to produce data representative of a frequency of an incumbent radio receiver and a degree of RF isolation, between at least one of the monitoring antennas and the incumbent radio receiver.

In accordance with a particular aspect of the invention, the processing device includes a device for storing signal level data measured by each of the antennas, and assigning one data record per antenna. In addition, devices are provided for detecting apparent bursts in the signal level data, and for determining when abnormally high signal levels are measured. The processing device may also include devices for re-measuring the signals, and for adjusting the signal levels when a re-measurement of the signals results in a lower measured signal level. The processing device may also include devices for integrating a signal measured over a specified frequency range, and for correcting the measured signal level data in accordance with calibration data.

In another aspect of the present invention, a method is provided for allocating one or more ranges of transmission frequency to an ancillary communications network which comprises a plurality of ancillary radio stations, in order to prevent any of said plurality of ancillary radio stations from interfering with received signals of an incumbent radio system which shares frequency space with said ancillary communication network, and which comprises one or more incumbent radio stations. The method comprises obtaining information indicative of the presence and location of the one or more incumbent radio stations, with the information comprising a plurality of signal level values and corresponding frequency values obtained from radio signals which are located within the frequency range of the incumbent radio system; processing the information into a form more closely representative of the actual presence and location of the one or more incumbent radio stations; and, in accordance with such processing, allocating one or more frequency ranges within which the ancillary communications network can transmit signals without interfering with received signals of the incumbent radio system.

In still another aspect of the present invention, a method is provided for allocating one or more ranges of transmission frequency to an ancillary communications network which comprises a plurality of ancillary radio stations, in order to prevent one or more of the plurality of ancillary radio stations from interfering with received signals of an incumbent radio system. The method comprises obtaining data regarding the availability of frequency ranges within which the ancillary communications network can communicate without interfering with the incumbent radio system; and, in accordance with the obtained data, allocating one or more frequency ranges within which the ancillary communications network can transmit signals.

In yet another aspect of the present invention, a method for monitoring signal levels is provided which comprises positioning a plurality of monitoring antennas adjacent an ancillary communications network; analyzing the spectrum of signals received at the monitoring antennas with a spectrum analyzer, and producing data representative of a signal level contained within at least one frequency band received by each of the antennas; and processing information which includes data produced by the spectrum analyzer to produce data representative of a frequency of an incumbent receiver and a degree of RF isolation between at least one of the monitoring antennas and the incumbent receiver.

The above-listed and other objects, features, and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of embodiments of the present invention, in which like reference numerals represent similar parts throughout the several views of the drawings, and wherein:

FIG. 12 illustrates a "keyhole" in accordance with a particular embodiment of the present invention;

FIG. 14 illustrates an example of a point-to-point incumbent radio system path; and FIG. 15 illustrates another embodiment of a frequency allocation control system according to the present invention.

DETAILED DESCRIPTION OF THE PREFERRED EMBODIMENTS

Figure 1:
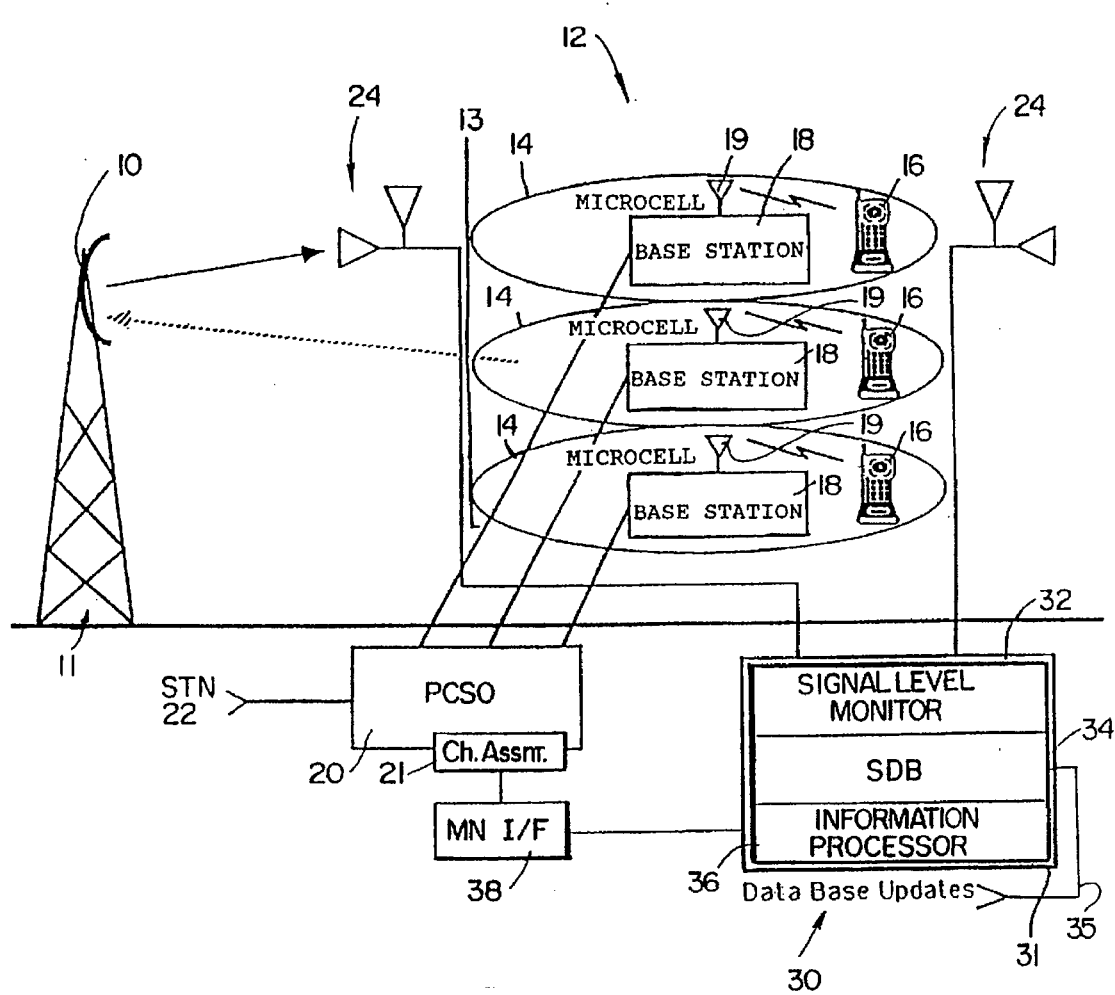
FIG. 1 illustrates a radio communications frequency allocation control system implemented in conjunction with a mobile network and an incumbent radio system.

Referring now to the drawings in greater detail, FIG. 1 shows a radio communications frequency allocation control system 30 for allocating one or more ranges of transmission frequency to a mobile communication network 12, and an antenna 10 of an incumbent radio system. Control system 30 comprises a plurality of sets of Signal Level Monitoring Antennas (SLMA's) 24, a signal level monitor 32, a system database (SDB) 34, an information processor 36, and a mobile network interface (MN I/F) 38. System database (SDB) 34 includes an input 35 which accepts database update information.

Mobile communications network (MN) 12 includes a group of microcells 14, each microcell including a base station 18 having at least one antenna, and one or more user terminals 16. PCSO (Portable Communications Switching Office) 20 is connected to each microcell 14, and includes an input which receives STN (Switched Telephone Network) 22, and a channel assignment device 21 which is coupled to mobile network interface (MN I/F) 38.

In accordance with the embodiment depicted in FIG. 1, MN 12 comprises a microcell telecommunications system having a plurality of continuous or discontinuous cells 14 arranged in the form of a microcell cluster 13, each microcell in a cluster typically having a different assigned set of transmission frequencies. By way of example, MN 12 may comprise a microcellular radio communications system such as disclosed by U.S. Pat. No. 5,067,149, the content of which is expressly incorporated by reference herein in its entirety.

Signal level monitor 32, system database (SDB) 34, and information processor 36, together comprise an analysis system 31. Allocation control system 30, by utilization of analysis system 31, allocates one or more ranges of transmission frequency to MN 12, by-sending a list of available channels to channel assignment device 21, via MN I/F 38. Channel assignment device 21 appropriately assigns the frequencies to respective microcells 14 within the microcell cluster 13 of MN 12, within the confines oft he available channel list defined by allocation control system 30.

For purposes of the disclosure contained herein, the list of available channels (i.e., the available channels list—ACL) can include either a list of available channels of an incumbent radio system which are free for use by an MN 12, or rather a list of segments of the available channels of the incumbent radio system, whereby, e.g., each segment corresponds to a frequency band utilized by MN 12.

Analysis system 31 determines the list of available frequency channels so that the mobile communication network (MN) 12, when utilizing those available channels, will not transmit signals which will interfere with signals received by a nearby incumbent radio system site 11. Signal level monitor 32 monitors the levels of microwave signals which are received by an SLMA 24 (and which will include, for example, signals which are transmitted from incumbent radio system antenna 10 of the nearby incumbent radio system site 11). System database (SDB) 34 includes information concerning nearby incumbent radio systems which may be readily accessed by information processor 36. Information processor 36 utilizes the information obtained by signal level monitor 32 and SDB 34 in order to determine the available ranges of transmission frequency which may be allocated to mobile communications network 12, and outputs a list of such ranges of transmission frequency in the form of an available channels list to channel assignment device 21 of PCSO 20, via MN I/F 38. Signal level monitor 32 periodically measures the level of microwave signals received at each SLMA 24 across an entire frequency band of interest. A separate set of SLMA's 24 may be associated with each microcell 14 (by, e.g., placing SLMA's at the periphery thereof).

Information processor 36 identifies detected signals and pairs those signals with corresponding information related to established incumbent microwave system stored in SDB 34. Channels used by nearby incumbent receivers are determined by information processor 36, based on measurement of signals from co-located transmitters. Information processor 36 then determines the probability that MN 12 will interfere with the nearby incumbent radio system, and furnishes a list of frequency channel segments which are available for use by each microcell cluster 13. A channel assignment algorithm, provided within the mobile switching system or base station controller of the mobile communications network (e.g., PCSO 20) assigns user channels to terminals 16 within each microcell 14, based upon the available channels list, and based upon subscriber demand.

Mobile communications network (MN) 12 may include a PCN (Portable/Person-Centered Communications Network)

which is functionally similar to conventional cellular and advanced cordless telephone networks. PCSO 20 of MN 12 provides mobility management (e.g., handoff from microcell-to-microcell 14), and connectivity (from portable terminal 16 to terminal 16). MN 12 may utilize such known techniques as dynamic channel assignment and mobile-assisted handoff in providing such a mobility management function.

In operation, the spectrum sharing system depicted in FIG. 1 will perform three general functions. An available channels list is periodically determined by information processor 36 in conjunction with SDB 34 and signal level monitor 32; the list is assigned to PCSO 20 via MN I/F 38 and channel assignment device 21; and MN 12 utilizes the available channels on a first-come first-serve basis.

Terminals 16 communicate with their respective base stations 18 via an MN control channel. Each terminal 16 (which may be portable) scans multiple control channels to identify which control channel is proper for the appropriate MN service provider. A particular user channel is assigned by base station 18, as dictated by PCSO 20 and channel assignment device 21.

Within the confines of the available channels list provided to channel assignment device 21, MN 12 will utilize only those frequencies for which a probability of interference with incumbent radio systems (such as nearby incumbent radio system site 11) will be negligible. Allocation control system 30, in determining the probability of interference at a particular frequency channel and location, adaptively compensates for various radio wave propagation effects, such as scattering from reflective objects near microwave antenna site 11, interference reduction by solid objects which attenuate signals received by incumbent receivers, the positioning and pattern of radio system antenna 10, the receiver bandwidth of the incumbent radio system site 11, and the location of microcell cluster 13. Allocation control system 30 also determines the probability of interference to the MN terminal 16 due to signals being transmitted by incumbent radio systems, such as from antenna 10 located at nearby site 11.

Figure 2:
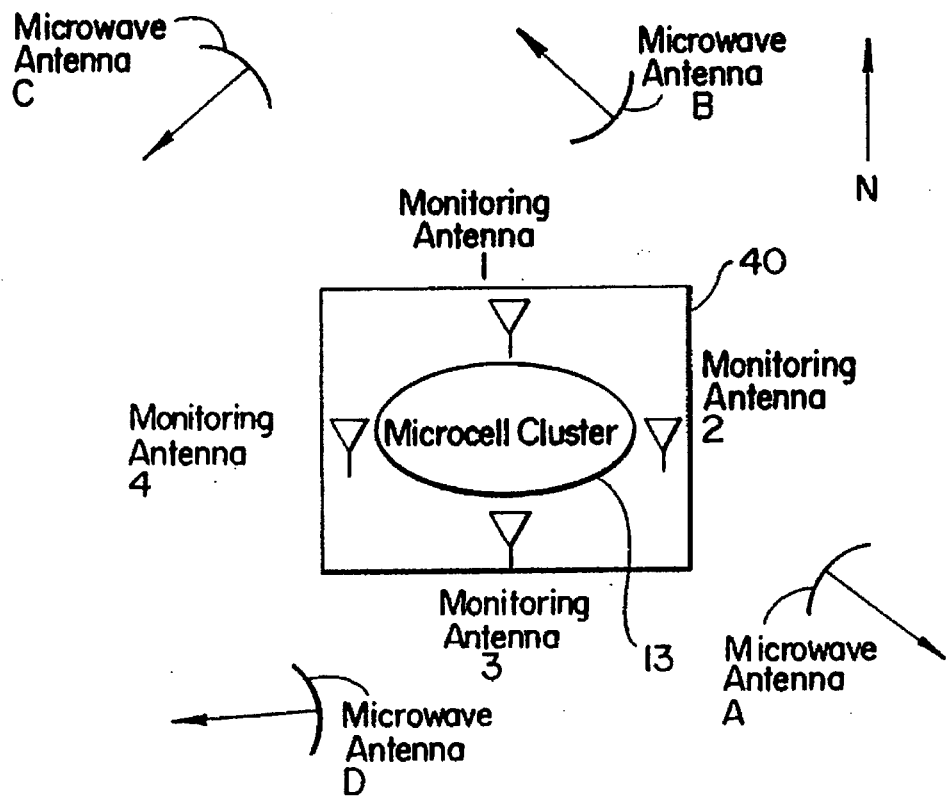
FIG. 2 illustrates a top view of a microcell cluster, associated signal level monitoring antennas and nearby incumbent radio system antennas.

FIG. 2 illustrates co-located transmitter/receiver antennas A, B, C, and D which surround a microcell cluster 13. Monitoring antennas (SLMA's) 1–4 are located at the periphery of microcell cluster 13, which is shown to be located within a building 40.

Each of SLMAs 1–4 is connected to a signal level monitor 32 (not shown; see FIG. 1). Signal level monitor 32 periodically scans all of the Channels which may be assigned to the nearby sites A–D, and reports the level and frequency of-received signals to information processor 36. Each of antennas A–D represents an antenna for a co-located transmitter/receiver of an incumbent radio system. The degree of RF isolation between microcell cluster 13 and a nearby receiver of an incumbent radio system corresponding to, for example, microwave antenna A, is readily determined by monitoring the signal of the co-located transmitter of site A (once the paired transmit/receive frequencies for site A are known). The transmitter and receiver associated with each of sites A–D may either share the same antenna or otherwise utilize separate antennas very close to one another. For purposes of simplification, FIG. 2 only depicts one antenna for each site.

Signal level monitor 32 can utilize various techniques to improve the reliability of transmission in the direction of incumbent systems to SLMA's 24, including, e.g., space diversity, polarization diversity, and the placement of the monitoring antennas 1–4 at the periphery of microcell cluster 13. By strategically positioning each SLMA at the periphery of microcell cluster 13, the levels of signals detected by each SLMA will be higher than signals which are propagated to locations within the cluster. Thus, by relying on the higher signal levels, which suggest a lower RF isolation, the system effectively ensures that a particular terminal within microcell cluster 13 will not interfere with a nearby incumbent system receiver which may be located at one of sites A–D, regardless of the location of the terminal within microcell cluster 13.

Multiple SLMA antennas (1–4—FIG. 2; 24—FIG. 1) are employed with both horizontal and vertical polarizations in accordance with a particular embodiment of the present invention, in order to improve the accuracy of the signal level measurements performed by signal level monitor 32 in a multi-path radio signal propagation environment. By configuring the antennas in such a fashion, the probability that frequency selective fading will occur is substantially reduced, thus decreasing the possibility of an erroneous decision about the probability of interference.

As noted above, for two-way point-to-point incumbent radio system links, the degree of isolation between a microwave cluster and an incumbent radio system receive antenna can be determined by monitoring signals transmitted from a co-located transmitter (which utilizes an antenna at the same site as the receive antenna), once the paired co-located transmit/receive frequencies are known. It is also necessary, in some situations, to identify the RF isolation of a receiver antenna of a one-way (simplex) incumbent radio system link, which does not comprise a co-located transmitter. The spectrum sharing system of the present invention identifies and utilizes elevation-dependent and geography-dependent spectrum "gaps", and assigns available frequency channel segments to PCSO 20 of the mobile communications network (MN) 12 so that MN 12 will only transmit signals which fit within those "gaps". For one-way (i.e., simplex) fixed incumbent radio system links, information is acquired from signal level monitor 32 and system database 34, and is utilized by information processor 36 in order to determine whether or not a particular microcell 14 falls within a three-dimensional exclusion zone for each one-way (simplex) incumbent radio system link. For two-way (i.e., duplex) fixed incumbent radio system links, a microwave transmitter which is co-located with a receiver of each site of the fixed incumbent radio system is used as a "beacon" to help determine the degree of RF isolation between the mobile communications network and the fixed receiver site, to thus determine whether there is likelihood of interference if the mobile communications network transmits signals within the frequency channel of the receiver.

Signal level monitor 32 is synchronized with the frequency assignment of MN 12 based on the channels which are assigned by channel assignment device 21 of PCSO 20. Signal level monitor 32 is synchronized to measure signal levels which are at frequencies not being utilized by MN 12, to thus prevent corruption of the measurements performed by signal level monitor 32. To effect the above-described synchronization, between channel assignment device 21 of MN 12 and signal level monitor 32 by way of example, MN 12 may be configured to indicate to signal level monitor 32, via MN I/F 38 when measurements can be made on certain frequencies. Alternatively, signal level monitor 32 may be configured to control/notify MN 12, via MN I/F 38, to avoid transmitting on certain frequencies for a specified time interval. In this regard, as an illustrative but nonlimiting example, information processor 31 may supply a "modified"

available channels list to MN 12, which does not include the frequencies to be measured by signal level monitor 32. Upon completion of a set of measurements by signal level monitor 32, the available channels list may again be modified, to include either a previously specified available channels list, or an additional modified channels list, (so that further frequencies can be measured by signal level monitor 32).

As noted above, one possible implementation for MN 12 includes the microcell system disclosed in U.S. Pat. No. 5,067,147. In accordance with a particular embodiment of the present invention, MN 12 includes the following protocol framework, in order to maximize the potential operation of the spectrum sharing system shown in FIG. 1, while allowing deployment of evolving mobile communications network technologies in conjunction with the spectrum sharing system.

Time Division Duplexing (TDD) may be preferred for the uplink and downlink radio protocol of MN 12 rather than Frequency Division Duplexing (FDD), because of the possible need to employ only one channel for mobile communications network transmissions in certain highly congested metropolitan areas. For example, TDD will be preferred in the event there is only one segment of available spectrum at any one time, e.g., in areas of high incumbent radio system usage. TDD will also facilitate the employment of space or polarization diversity antennas at the MN base station to enhance performance of both uplinks and downlinks of the system. An FDD protocol may be utilized, as long as pairs of channel segments, (i.e., pairs of available channel segments, intended for the uplink and the downlink, respectively) are included in the available channels list produced by information processor 36. Should MN 12 utilize an FDD protocol, various transmit/receive frequency offset spacings (between the uplink and downlink) may be employed. In such a case, with various offset frequency spacings, information processor 36 should be provided with a device for adaptively assigning pairs of frequencies which are spaced in accordance with the FDD protocol of MN 12.

In one example of MN system 12, two PCN channel protocols may be utilized: a control channel protocol and a user channel protocol. The control channel and user channel protocols allow users subscribing to multiple licensed MN services (such as PCN) to share a single incumbent radio channel in a given geographical area. This is possible since several specific control channels are spread across the entire frequency band to be shared, and subscriber terminal receivers are programmed to scan all the control channels until they identify the strongest home system control channel. In addition, an MN base station will assign user channels on a first-come, first-serve basis until the available spectrum is entirely utilized for a given serving area.

User terminals 16 may be provided with automatic transmitting power adjustment devices, so that only the minimum needed transmitter power can be utilized. Such a transmitter power adjustment device will preferably be provided with a wide power adjustment range so that user terminals 16 may accommodate varied user density applications.

Depending on the particular application, the width of the user and control channels of MN 12 may preferably be less than the width of the narrowest channel of the incumbent radio system. So that MN 12 can operate concurrently with the incumbent radio system using a common block of the frequency spectrum, each of user terminals 16 should be provided with, e.g., an RF tuning range of at least two or three times the width of one channel of the incumbent radio system. When the incumbent radio system comprises, e.g., a fixed point-to-point microwave radio system, the RF tuning range may preferably be, e.g., at least 30 MHz, or at least 140 MHz (where the incumbent radio system has a channel width of about 10 MHz).

In addition, the RF tuning range may be at least 4 MHz (where the incumbent radio system has a channel width of less than 1 MHz).

In order to accommodate multiple low-power PCS service providers in the same geographic area who must share a common block of spectrum, MN 12 can comprise multiple system control channels across the entire frequency band of the incumbent radio system.

In accordance with a particular aspect of the present invention, MN 12 is provided with base station controlled handoff, which can optionally be mobile-assisted. Accordingly, the assignment of frequency channels by MN 12 can be controlled via base stations 18, which are coupled to information processor 36 of allocation control system 30 as shown in FIG. 1.

Further information regarding implementation of MN 12 is included in "Cellular Mobile Telephone System, CME 20 System Description", document LZT 120206 En, which is published by Ericsson Radio Systems AB, S-16480 Stockholm, Sweden, telephone 468-757-0000, the content of which is expressly incorporated herein by reference in its entirety. Additional information regarding cluster-to-cluster handoff protocol is included in Electronic Industries Association document EIA/TIA/IS-41.1-B (December, 1991), entitled "EIA/TIA Interim Standard, Cellular Radio-Telecommunications Intersystem Operations: Functional Overview," (which may be obtained from Global Engineering Documents, 2805 McGaw Avenue, Irving, Calif. 92714, (714) 261-1455, (800) 854-7179), the content of which is also expressly incorporated herein by reference in its entirety.

Further to the above-described MN protocol framework which can be used in conjunction with the sharing system shown in FIG. 1, it is noted that the MN protocol framework can include both conventional (e.g., circuit-switched, primarily voice) mobile networks and evolving (e.g., packet-switched, multimedia) mobile networks. One example of an evolving network includes a system which utilizes ATM switches and a high-speed backbone network fabric with an ATM-compatible fixed length cell relay format (e.g., 48 byte ATM cell payload). See, e.g., D. Raychaudhuri and N. Wilson. WINLAB Workshop Record, April, 1992, pp. 259–288, the content of which is expressly incorporated by reference herein in its entirety.

MN I/F 38 may be implemented by the use of a local controller or alternatively by a signalling connection (e.g., ISDN). In such a case, each base station will be provided with its own autonomous DCA (Dynamic Channel Assignment) process, and will employ quasi-fixed control channels so that each handset may only transmit on certain channels within which interference to incumbent radio microwave systems will be avoided. Handoffs among MN base stations would involve the local controller of a cluster of MN base stations, if so equipped.

In an alternative example type of MN 12, MN 12 includes a PCN which does not provide inter-cell handoff, but provides intra-cell handoff and is programmed to utilize only certain microwave channels. The base stations of such systems are operated by various service providers, and would not be required to communicate with one another. All spectrum sharing system compatible base stations would, however, receive the available channels list, which is output by information processor 36 of the allocation control system 30.

Figure 3:
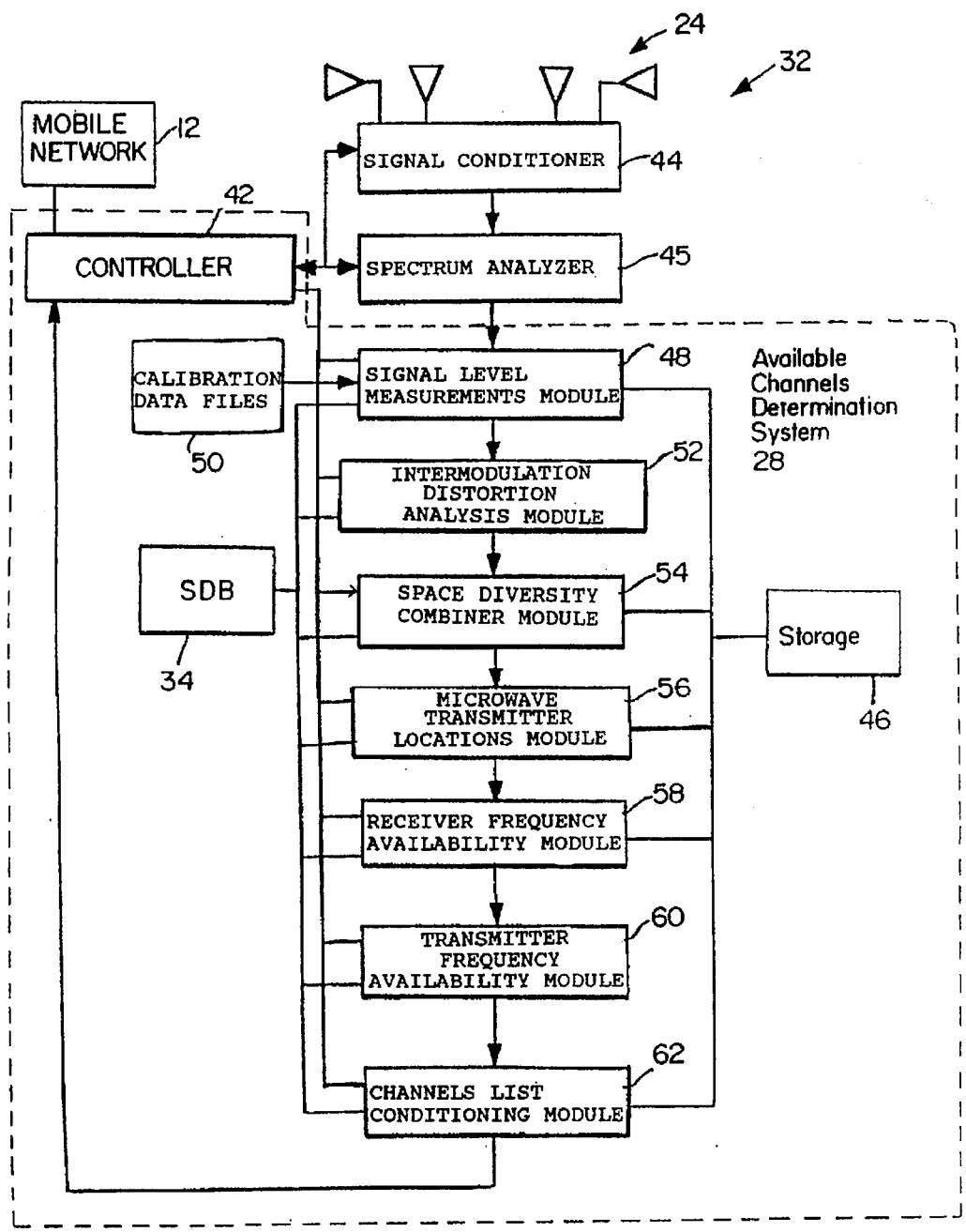
FIG. 3 illustrates an available channels determination system connected to a signal level monitor in accordance with a particular embodiment of the present invention.

FIG. 3 shows a detailed block diagram of allocation control system 30. Essentially, the signal level monitor 32, SDB 34, and information processor 36 of FIG. 1 are implemented by the combination of signal level monitor 32, SDB 34, controller 42, and available channels determination system 28, which are depicted in FIG. 3. Referring to the particular embodiment shown in FIG. 3, a plurality of signal lever monitoring antennas (SLMA's) 24 are connected to a signal conditioner 44, which is in turn connected to a spectrum analyzer 45. A controller 42 is provided which controls various devices during the operation of available channels determination system 28. Controller 42 also facilitates transfer of data and information to and/or from mobile network 12.

Determination system 28 is coupled or connected directly to an output of spectrum analyzer 45, and to a control line of controller 42. Determination system 28 includes a Signal Level Measurements module (SLM) 48, an Intermodulation Distortion Analysis module (IDA) 52, a Space Diversity Combiner module (SDC) 54, a Microwave Transmitter Locations module (MTL) 56, a Receiver Frequency Availability module (RFA) 58, a Transmitter Frequency Availability module (TFA) 60, and a Channels List Conditioning module (CLC) 62, all of which are connected in cascade from spectrum analyzer 45 to controller 42. Each of System Data Base (SDB) 34 and storage 42 is connected to each and every one of the information modules 48, 52, 54, 56, 58, 60, and 62. A calibration data file 50 is coupled to Signal Level Measurements module (SLM) 48.

The various modules of AMC determination system 28 utilize information obtained from signal level monitor 32 and SDB 34 in order to perform various processing functions in the process of deriving an Available Microwave Channels List (AMCL).

Signal conditioner 44 may comprise one or more of low noise RF amplifiers, fixed and variable electrically or electronically controlled attenuators, directional couplers (for system calibration), RF band pass and notch filters, and multiple-positioned RF switches (to allow selection of the desired antennas). Spectrum analyzer 45 is provided with the necessary structure to perform time-gated spectrum analysis. Byway of example, spectrum analyzer 45 may be implemented by a commercially available spectrum analyzer provided by Hewlett Packard, HP8594A, an RF spectrum analyzer, 9 kHz to 2.9 GHz, which is described in a technical document by Hewlett Packard (Nov. 1, 1990), HP Publication No. 5952-2757, the content of which is expressly incorporated herein in its entirety.

Signal conditioner 44 may employ one or more techniques for achieving a high dynamic range, such as distortion cancellation and active devices which have particularly low noise characteristics. In addition, e.g., one or more junctions or communuications paths (e.g., an optical fiber link which may be placed between an SLMA 24 and an input of signal conditioner 44) which carry signals from SLMA's 24 and spectrum analyzer 45 may be provided with a dynamic range enhancing system such as is disclosed in copending, commonly assigned U.S. patent application Ser. No. 07/704,114, filed on May 22, 1991, the content of which is expressly incorporated by reference herein.

Antennas 24, which are utilized by signal level monitor 32, as shown in FIG. 3, may include either omni-directional or directional antennas, depending upon the application.

Signal level monitor 32, as noted above, produces information which will form one of two sets of information which will be utilized by the modules of AMC determination system 28. The other component of AMC determination system 28, which produces the second needed set of information, comprises SDB 34. SDB 34 includes four categories of information. Category 1 includes information related to information supplied to the Federal Communications Commission. Such information may include, e.g:

(a) the names of companies having certain microwave communications systems;

(b) at what frequencies such communications systems transmit and receive signals;

(c) the location of such systems;

(d) the type of equipment used in such systems (e.g., antennas, etc.);

(e) pertinent parameters regarding the above-noted factors; and (f) additional information such as the name of the equipment manufacturer, the FCC file number, the FCC call sign, and other information of this type.

Table 1, appended hereto, includes a list of examples of Category 1 data which can be found in SDB 34. Category 1 may be provided by a third party which maintains a database based upon information obtained from the FCC and any other available information. The third party may include, for example, an organization which is involved in frequency coordination for radio system licensees (e.g., Comsearch), which maintains its own database, updated periodically from FCC licensed applications and data. Such information may optionally be downloaded to SDB 34, e.g., via a telephone network by using a data modem.

The second category of information, which is included in SDB 34, includes information-derived from the information in Category 1. The information of Category 2, however, is more specific in that it lists pertinent specifications related to incumbent radio system sites of interest. A listing of representative information from Category 2 is shown in Table 2 (appended hereto). It is noted that Side 1 and Side 2 represent, respectively, the numbers of the respective sites in a point-to-point incumbent radio communications system. It is noted that when a frequency is given for a particular side (i.e., a site), that frequency is indicative of a transmit frequency for that site, rather than the receiver frequency, since the FCC is more concerned with the transmit frequency of a particular site. Occasionally, a one-way path will be included in the FCC list (Category 1) information, and thus corresponding information will be listed in Category 2; however, blank information will be provided for the transmitter information in Category 2.

The information of Category 2 may be entered manually, and is preferably directly appended to the data file in which Category 1 has been placed. A one-way path will be typically noted in Category 1, with the variables EQPMANN being "receive", EQPMODN being "only", and FCC EQP-CODN being "999999." The variable POWERN will typically be "0.0", and the transmit frequency will be " " (blank).

Category 3 includes information which is characteristic of signal level monitor 32 and MN 12. A listing of representative information from Category 3 is shown in Table 3 (appended hereto). Such information may include, for example, the location of a microcell cluster, the characteristics of MN 12 (e.g., interference thresholds, users per microwave channel, average power per terminal transmitter, etc.), the direction toward which signal level monitor antennas. 24 are oriented, and other information pertinent to the status of various modules of determination system 28.

Referring to FIG. 3, SLM 48 processes (using a calibration data file 50) the spectrum analyzer data which is available as a result of the measurements performed by signal level monitor 32. SLM 48 provides a separate set of processed data for each Signal Level Monitoring Antenna (SLMA) 24, each set including corrected signal level values which indicate the actual signal level as received at the terminal of signal monitoring antenna 24. SLM 48 detects whether any overly high signal levels are present, and, in addition checks for equipment-generated noise bursts. If either high signal levels or equipment-generated noise bursts occur, signal level monitor 32 will be requested to re-measure all of the frequency spectrum of interest (or a portion thereof) which was corrupted. If the signals are overly high, an adjustment can be made to an attenuator or other signal level changing device in signal conditioner 44 to eliminate overloading of the system. It is noted that noise bursts may be readily identified by their temporary nature, as compared with the usual constant nature of the incumbent system radio signals.

Intermodulation Distortion Analysis module (IDA) 52 further processes the corrected SLM data to remove system generated intermodulation distortion effects before the information is utilized by other modules. IDA 52 analyzes the amplitude and frequency of signals which are stronger than a threshold value (e.g. −50 dBm) within the frequency band of interest. Predicted intermodulation signal data is subtracted from SLM output data in order to improve the quality and reliability of the measured data.

Space Diversity Combiner module (SDC) 54 determines the highest received signal level for each set of antennas having a particular polarization type at each location. Thus, for antennas having a horizontal polarization at a particular location, the highest received signal level among these antennas is determined. Similarly, among the vertically polarized SLMA's at each location, the highest received signal level is determined and stored.

Microwave Transmitter Location module (MTL) 56 associates the locations of the incumbent microwave system sites which correspond to each signal represented in the data file produced by SDC 54.

Receiver Frequency Availability module (RFA) 58 takes the information produced by MTL 56 (which is assumed to be indicative of those duplex microwave link sites and microwave channels which likely have the least amount of RF isolation from the microwave cluster of interest), accesses SDB 34 to determine those duplex receivers which are particularly susceptible to interference (due to low isolation), and determines which duplex microwave channels should not appear in the list of available channels because of the potential for PCN-to-microwave interference.

Transmitter Frequency Availability module (TFA) 60 subsequently accesses SDB 34 to determine which additional microwave channels should not appear in the list of available channels due to a high potential for microwave-to-PCN interference.

Channels List Conditioning module (CLC) 62 determines whether a microcell cluster is located within any one-way receiver exclusion zone, and if so, what channels should be excluded from the available channels list (ACL) which is output by information processor 36 (FIG. 1). In doing so, CLC 62 produces a Measured Available Channels List (MACL) which reflects changes to the ACL based solely on the measurements performed. CLC 62 will refer to a microwave channel history file (MCHF) to determine whether one or more channels listed in the MACL should be ignored, until such time as they are verified to be accurate. Each MACL is stored in the MCHF, so that current MACL's can be compared to previous MACL's stored in the MCHF in order to verify the accuracy of the current MACL. Any verified changes to the ACL will be added to or subtracted from the ACL.

The MCHF, which is contained in a fourth category of SDB 34, is utilized by CLC 62 to get a historical perspective on recent and past MACL's. As noted above, CLC 62 determines the conditions under which it would be desirable to suppress any recent changes indicated by MACL. One possible scenario under which it would desirable to suppress a change to the channel list is when a microwave transmitter is turned off suddenly for maintenance. If the FCC license and path status in MSDB 34 indicates that a transmitter associated with a certain available channel change is still in service, it is likely that there has been a transmitter failure or that it has merely been taken down for maintenance. In this case, the co-located receiver may still be properly operating.

Accordingly, the frequency corresponding to the co-located receiver would clearly not be available.

CLC 62 may be configured to provide a list of pairs of available channel segments having various widths, with segment-to-segment spacings (i.e., transmit/receive offsets) ranging from, e.g., 40 to 120 MHz. The segment-to-segment spacings may be entered into controller 42, e.g., manually by a system operator. By providing pairs of available channel segments, an MN 12, which employs FDD uplink and downlink protocols, can be utilized, by, e.g., assigning a first frequency from the pair to the uplink and the second frequency to the downlink.

As a point of reference, in explaining the operation of the various modules which comprise channel determination system 28 and controller 42, FIG. 14 is provided which illustrates a point-to-point incumbent radio system duplex link 80. A path 82 is formed between two incumbent radio station sites, SIDE1 and SIDE2. At a first site (SIDE1), link 80 includes a receiver R1, a co-located transmitter T1, and a transmit/receive antenna A1. At a second site (SIDE2), link 80 includes a receiver R2, a co-located transmitter T2, and a transmit/receive antenna A2.

Referring to the two-way link 80 shown in FIG. 14, a one-way link could comprise, e.g., first site SIDE1 having only a transmitter T1, and second site SIDE2 having only a receiver R2, the transmitter T1 and receiver R2 being connected to antennas A1 and A2, respectively.

The operation of the various modules which comprise channel determination system 28 and controller 42 will now be described in further detail with reference to the flow charts depicted in FIGS. 4–11.

Figure 4:
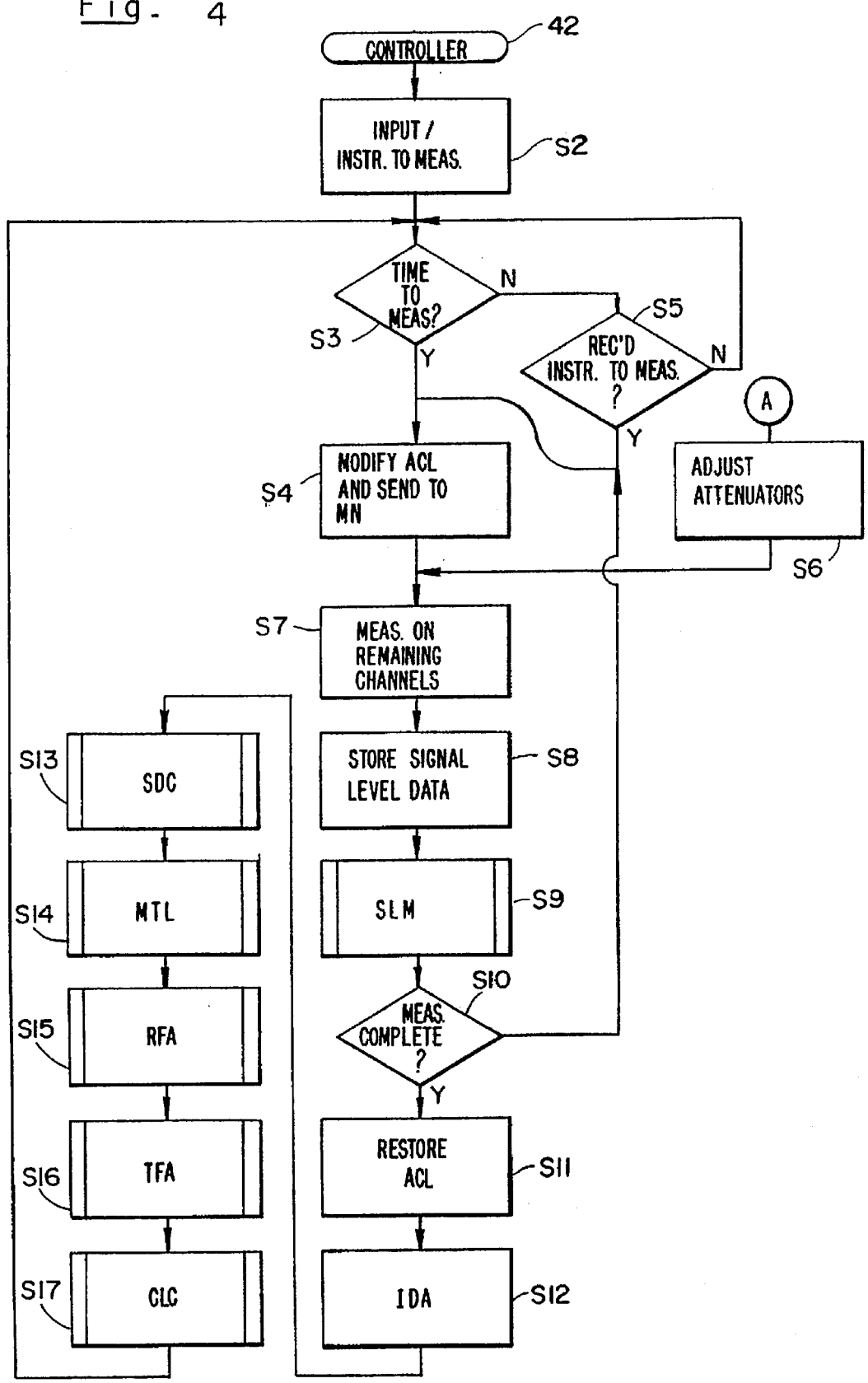
FIG. 4 illustrates the operation of controller 42 of available channels determination system 28 shown in FIG. 3.

FIG. 4 illustrates the functional operation of controller 42. In step S2, controller 42 awaits input, such as instructions for spectrum analyzer 45 to measure certain portions of the frequency spectrum of interest (i.e., a portion of the spectrum occupied by incumbent microwave systems near mobile communications network 12). In step S3, a determination is made as to whether a set period of time (such as twenty-four hours) has passed, and it is time to measure. If it is not time to measure, controller 42 will proceed to step S5, and a determination is made as to whether measurement instructions have been received. If no such instructions have been received, controller 42 returns to step S3, and again checks whether a preset period of time has passed (in step S3) and whether explicit instructions have been input to controller 42 (in step S5), thus indicating that signal level monitor 32 (FIG. 3) should commence measuring.

Once controller 42 is instructed to commence measurement, in step S4, controller 42 will modify the available channels list and send the modified available channel list to mobile network 12, so that the channels which are measured by signal level monitor 32 will not interfere with the channels being utilized by mobile network (MN) 12.

In step S7, controller 42 instructs the appropriate devices to measure signals within a plurality of defined frequency bands which fall within the channels which are remaining (i.e., not being utilized by MN 12). Subsequently, at step S8, controller 42 will store the measured signal levels in storage 46 (FIG. 3). In step S9, Signal Level Measurement module (SLM) 48 will be activated in accordance with the flow depicted in FIG. 5. Subsequently, at step S10, controller 42 will determine whether the measurement is complete. For example, SLM 48 may give a signal that the measurement is not complete, due to some error in the signals received, or another modified ACL may be needed so that the spectrum analyzer may measure the rest of the frequency band of interest.

If the measurement is not complete, as determined at step S10, controller 42 will return to step S4. If the measurement is determined at step S10 to be complete, the actual available channels list, under which mobile network 12 operated before execution of step S4, will be restored in step S11. Sequentially thereafter, insteps S12, S13, S14, S15, S16, and S17, each of respective modules IDA 52, SDC 54, MTL 56, RFA 58, TFA 60, and CLC 62, will be executed, before the process returns to step S3 to await another instruction to measure.

Figure 5:
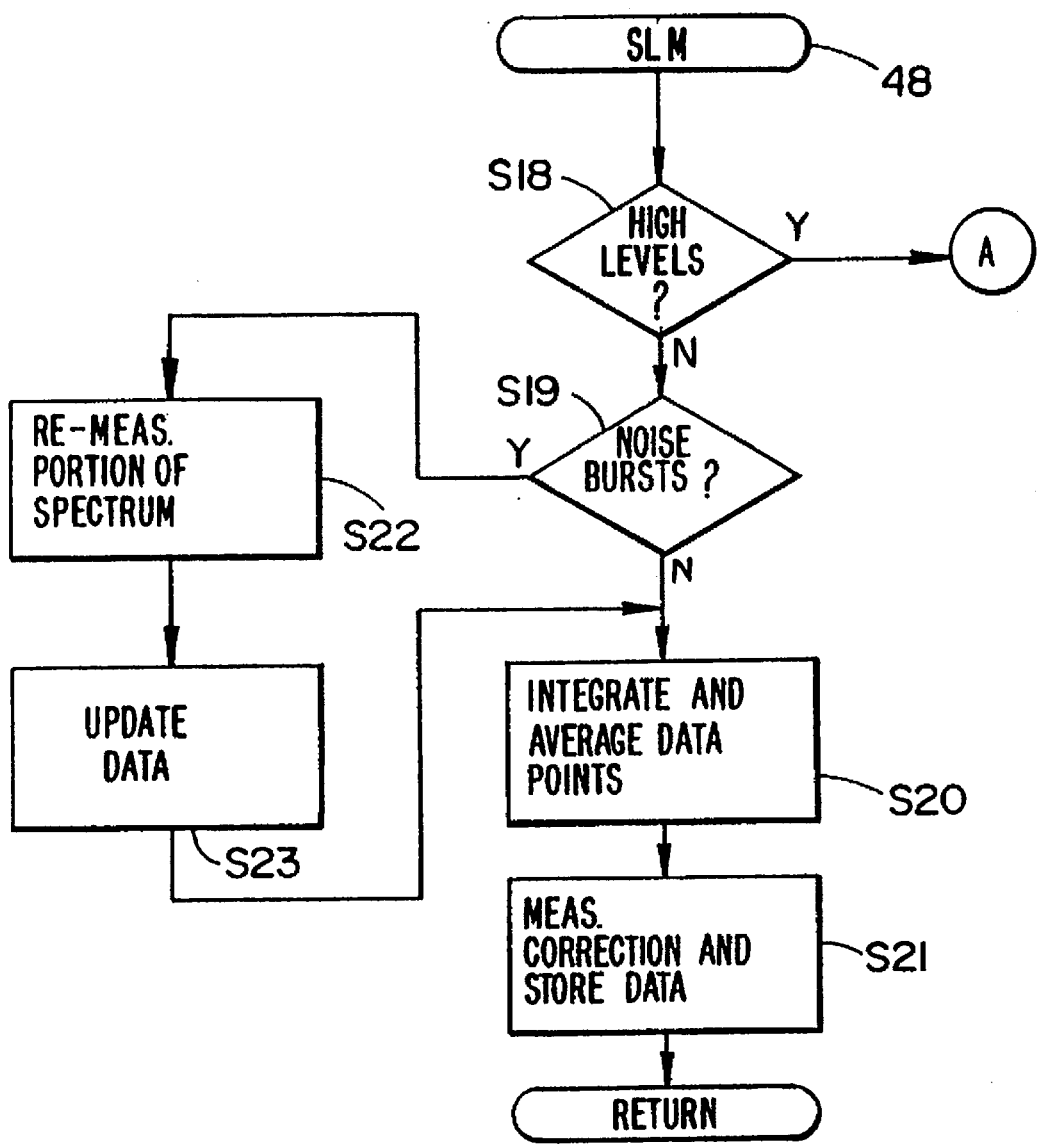
FIG. 5 illustrates the operation of a signal level measurement module (SLM) 48.

The operation of SLM 48 is depicted in the flow chart shown in FIG. 5. At a first step S18, a determination is made as to whether an excessively high signal level (which is above a predetermined threshold value) has been detected by spectrum analyzer 45 (FIG. 3). If any excessively high levels have been measured as determined in step S18, SLM 48 will return to the controller processing depicted in FIG. 4, and proceed to step S6 as shown in FIG. 4. Accordingly, one or more corresponding attenuators or other signal level changing devices (not shown) in signal conditioner 44 (FIG. 3) will be adjusted, at step S6, to reduce the potential for spurious responses, maximize the overall dynamic range of the spectrum analyzer, and increase measurement accuracy. Referring back to FIG. 5, if no excessively high signal levels are measured, in step S19, a determination is made as to whether any signal noise bursts exist. If a noise burst exists, SLM 48 proceeds to step S22, and a corresponding portion of the spectrum will be re-measured. In step S23, the signal level data will be updated in accordance with the re-measurement. In step S20, subsequent to ensuring (in steps S18 and S19) that all measurement data is not corrupted, multiple sets of signal level data points (i.e., signal level values), each set corresponding to a discrete frequency range, will each be averaged over time. The resulting averaged signal level values will be integrated over predetermined ranges of frequency (such as overt he entire incumbent radio channel, to eliminate the concern over the signal power spectral density of the incumbent radio signals). In this regard, it is noted that the data points may be processed in accordance with one or more known signal processing techniques. By way of a non-limiting example, in order to compensate for weak signal reception by the SLMA's, signal processing techniques disclosed in one or more of the following references may be implemented: Hedges, S. A., "Triple-Channel Interferometer Radio Direction Finder Minimizes Error-Source Effects", *Microwave Systems News*, May, 1984, pp. 94–97, and Drentea, C., "New trends in communication technologies: radio astronomy and the search for extraterrestrial intelligence, "*Ham Radio*, March, 1985, pp. 10–35. Because by its random nature, noise does not add coherently or consistently from measurement to measurement as a transmitted signal does. For example, by sampling each received signal ten times and then applying averaging, the effective noise power can possibly be reduced by a factor of 10 dB.

In step S21, the measured data is corrected using a calibration data file 50 (FIG. 3), and stored. It is noted that for each signal level monitoring antenna (SLMA) 24 (FIG. 3) of signal level monitor 32, a data file is provided which includes a plurality of signal level values corresponding to signals contained within respective frequency bands of measurement. SLM 48, at step S21, Uses calibration data files 50 (FIG. 3) to correct the signal level values measured and outputted by the spectrum analyzer to obtain signal level values which accurately represent the signals received by each of the antennas (SLMA's 24) (as seen by each of the antennas). Thus, any errors or changes which may occur due to losses or gains in the path which extends between the receiving antenna and the output of the spectrum analyzer are corrected for. Calibration data files 50 (FIG. 3) may include, e.g., a set of correction factors (each factor corresponding to a specified frequency) for each data file which corresponds to a specified SLMA, and may, for example, include constants which should be added or subtracted to respective signal values output from the spectrum analyzer.

Subsequent to execution of the measurement correcting step S21, and storage of the data obtained thereby, SLM 48 returns to controller 42.

Figure 6:
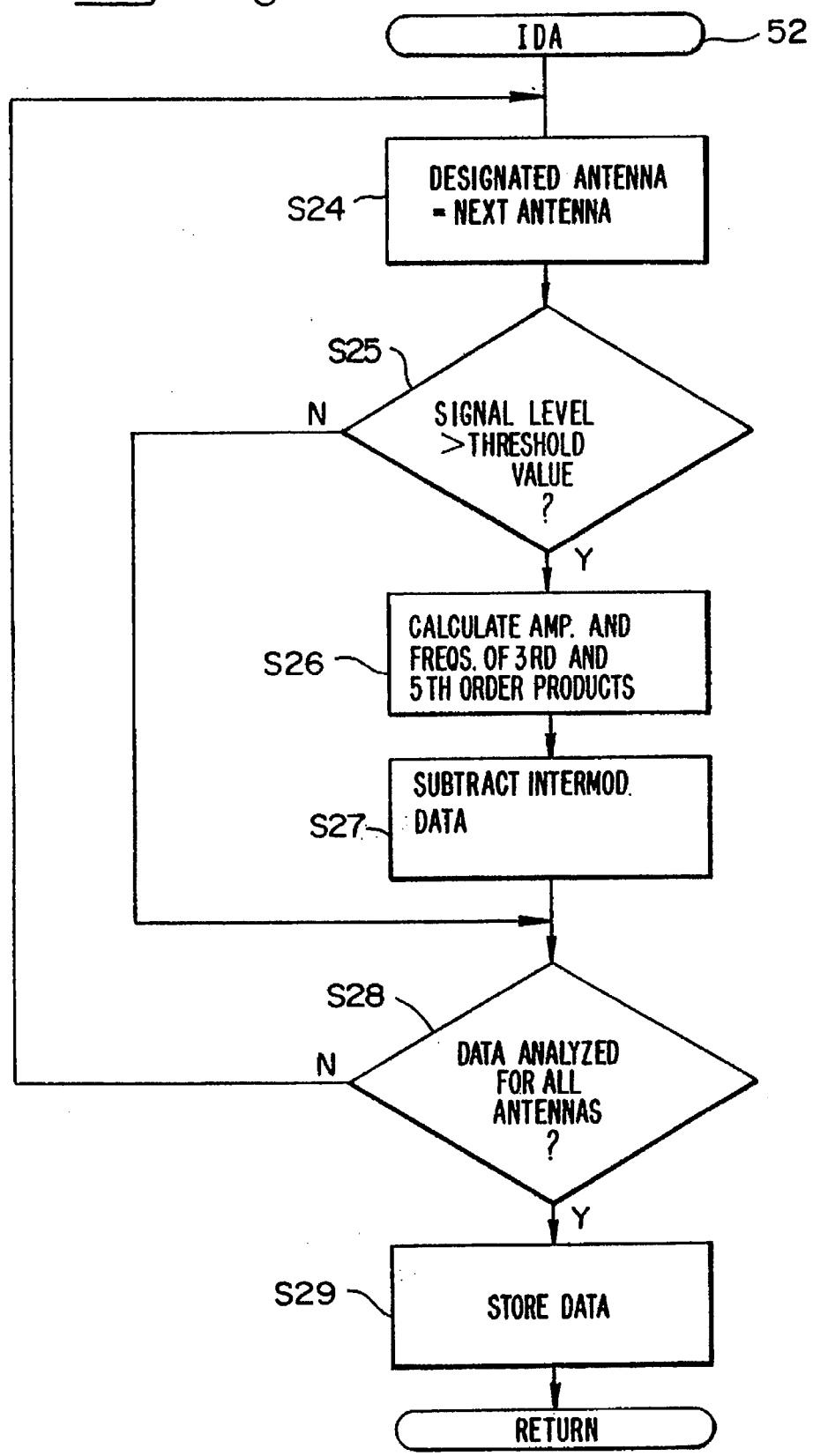
FIG. 6 illustrates the flow chart which represents the operation of an Intermodulation Distortion Analysis module (IDA) 52.

The operation of Intermodulation Distortion Analysis module (IDA) 52 is depicted in FIG. 6. IDA 52 further processes and corrects the data produced by SLM 48 to remove system generated intermodulation distortion effects before the measurement data is utilized by other system modules. In step S24, IDA 52 specifies a designated SLMA which corresponds to a set of signals to be analyzed and corrected by IDA 52. In step S25, a determination is made, for the designated SLMA, of whether any signals for that antenna are greater than a predetermined threshold value (e.g., −50 dBm) for each data point within the total frequency band of interest (e.g., 1.85 to 2.2 GHz) over which the spectrum analyzer has produced signal level values.

Subsequently, in step S26, IDA 52 calculates (i.e., predicts) the amplitudes and frequencies of two-tone and three-tone third order and fifth order intermodulation products which would result from such high-level signals as determined in step S25. This calculation is performed assuming third-order and fifth-order behavior and taking into account the overall receiver third-order and fifth-order input intercepts. In this regard, reference is made to HEITER, G. L., "Characterization of Nonlinearities in Microwave Devices and Systems," IEEE Transactions on Microwave Theory and Techniques, Vol. MTT-21, no. 12, December, 1972, pp. 797–805, the content of which is expressly incorporated by reference herein in its entirety. In step S27, the predicted intermodulation signal data is then subtracted from the stored corrected measurement data produced by SLM 48 (FIG. 5) in order to further improve the quality and reliability of the spectrum analyzer measurement data.

In step S28, a determination is made as to whether the data has been analyzed for all SLMA's. If such is the case, in step S29, the resulting data is stored in appropriate data files, and IDA 52 returns to controller 42 (FIG. 4). In the alternative, if it is determined in step S28 that the data for all SLMA's has not yet been analyzed, IDA 52 will return to step S24 where data which corresponds to a next SLMA will be designated for analysis. It is noted that if at step S25 there are no signals which are greater than the given threshold value, IDA 52 will skip steps S26 and S27. The data produced by IDA 52 may be separately stored in a manually selected data storage device so that, e.g., a written report may be generated for later analysis.

Figure 7:
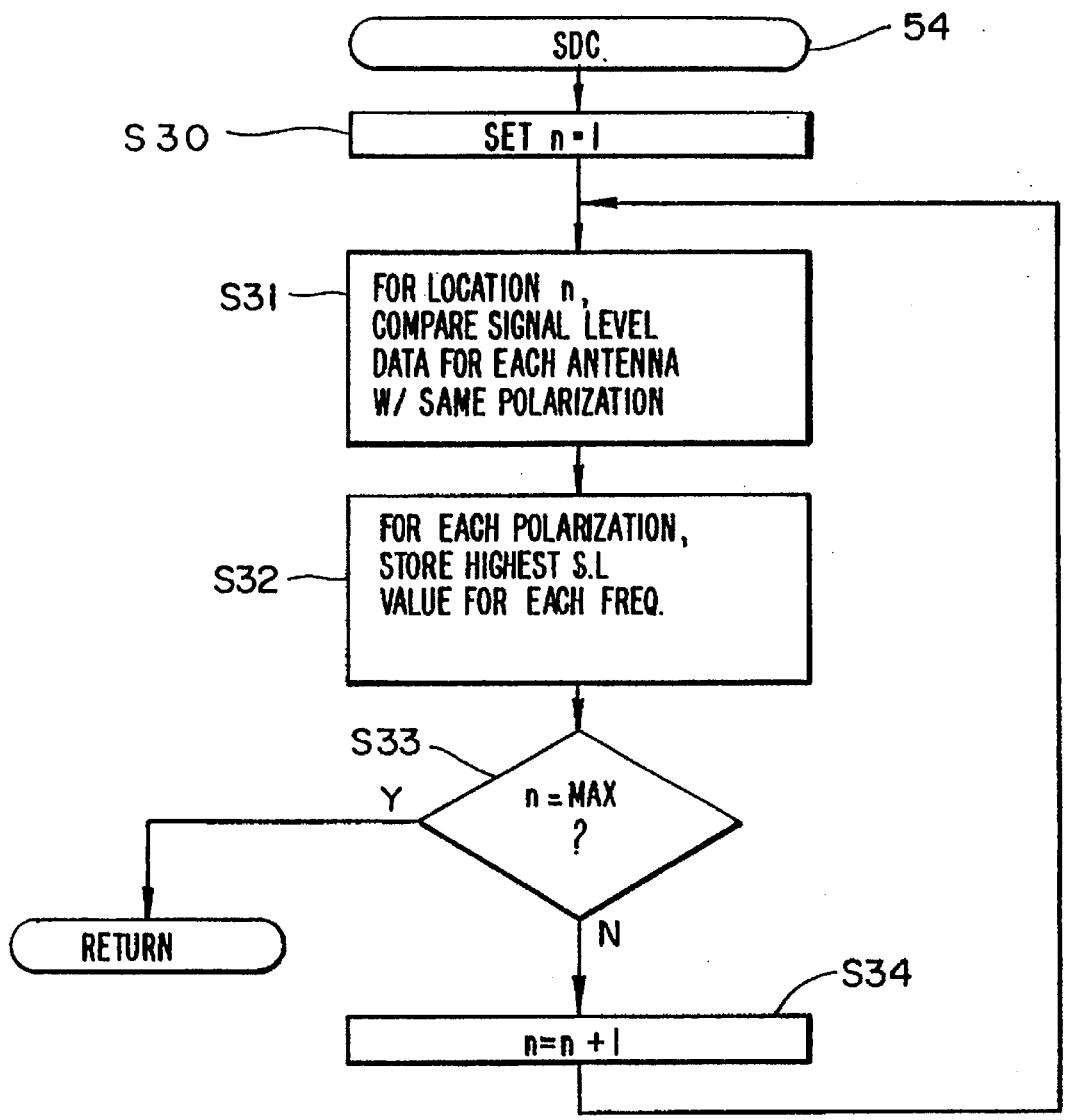
FIG. 7 illustrates the operation of a Space Diversity Combiner module (SDC) 54.

The operation of Space Diversity Combiner module (SDC) 54 is depicted in the flow chart shown in FIG. 7. SDC module 54 determines the highest received signal level at each SLMA location for each of a plurality of SLMAs at that location having the same polarization. Thus, if horizontal and vertical polarization SLMAs are provided, for each location, two values will be recorded for each frequency increment: a horizontal polarization signal level value, and a vertical polarization signal level value. For SLMA locations 1, 2, . . . N, a set of highest received signal levels for the horizontally polarized SLMAs will include H1, H2, . . . HN. Similarly, a set of highest received signal levels for the vertically polarized SLMAs will include V1, V1, . . . VN. In the event space diversity is not employed at any SLMA location, i.e., only one antenna is provided per polarization type, SDC 54 will output a single available signal value for each antenna polarization type.

It is noted that the notation 1, 2, . . . N should correspond to SLMA azimuths listed in category number 3 of SDB 34 (see Table 3, appended her&to), as AZ1, AZ2, . . . AZN, which represent the azimuth value (with respect to North) of the direction at which each antenna 1, 2, . . . N, respectively is positioned. Accordingly, for directional antennas (or omnidirectional antennas which are configured or positioned near an object which gives them a "directional" effect; e.g., an omnidirectional antenna may be mounted on the periphery of a building), an indication is given by the signals received by each oft he antennas as to the direction from which received signals are originating. If only one SLMA location is employed, the value of AZ1 shall be entered as "360".

Referring to FIG. 7, in step S30, an index n is set to be 1; n is representative of the number of an SLMA location associated with the data to be analyzed and processed by SDC 54. At step S31, the signal level data is compared for each SLMA at location "n" with the same polarization to determine the highest signal level value. At step S32, for each polarization at location "n", the highest signal level value corresponding to each frequency is stored. The highest signal level values corresponding to the SLMA's at location "n" having a horizontal polarization will be stored in a temporary file Hn. The highest signal level values corresponding to the SLMAs at location "n" having vertical polarization will be stored in a temporary file Vn.

At step S33, a determination is made as to whether n is equal to the maximum number of locations to be analyzed and processed by SDC 54. If so, SDC module 54 will be returned to controller 42 (FIG. 4). However, if further locations are to be processed, SDC 54 will increment n at step S34, and return to step S31.

The operation of Microwave Transmitter Locations module (MTL) 56 is shown in FIGS. 8A–8E. MTL 56 determines (see Step S35) the likely locations of nearby receivers and/or microwave transmitters associated with each signal level which has been stored by SDC 54 (in temporary data files H1, H2, etc., and temporary data files V1, V2, etc.), which corresponds to a received level at the SLMA which is greater than a threshold amplitude value MTLA (e.g., −113 dBm) specified in a given small bandwidth (e.g., 5 MHz). At step S36, upon determining that the amplitude is above the MTLA threshold, the frequency and amplitude of each data point is stored in temporary data file A, along with a notation of whether the data was based on horizontal or vertical polarization measurements, and with which SLMA location the data point was associated. Thus, steps S35 and S36 will be repeated, until it is determined at step S36.1 that data corresponding to all frequencies, locations, and polarizations has been analyzed.

Steps S37–S40 are performed for each data point which has been stored in temporary data file A and for each and every point-to-point transmission path (of the incumbent radio system) listed in SDB 34 (FIG. 3). In step S37, a determination is made as to whether the frequency of a particular data point falls within a frequency channel of a transmitter from either side of a particular transmission path listed in system data base (SDB) 34 (based on the values FREQN and CH_BW). If the data point does fall within the channel, a further determination is made at step S38 as to whether the SLMA location (which corresponds to the position of a microcell cluster) is within the long section of the "keyhole" corresponding to that side of the incumbent radio transmission path. If it does fall within the keyhole, the process will skip S39 and proceed to step S40. If the SLMA location is not within the long section of the keyhole, a further determination is made at step S39 as to whether the SLMA location is within MTLD miles of the microwave site (indicating that the SLMA location is within the core portion of the keyhole, to be further described below). If from steps S38 and S39, MTL 56 determines that the SLMA location is within the keyhole of the radio site of interest, which suggests that the RF isolation between the SLMA location the site is below a certain amount, the appropriate path and SLMA data are stored in temporary data file B at step S40.

With respect to step S38, the determination of whether the particular SLMA location is within the long section of the "keyhole" is made by calculating DIST, AZDF, and AZIMUTHN. DIST represents the distance in miles from a microcell cluster (near which the SLMA's are located) to a co-channel incumbent transmitter site. The distance DIST, from the microcell cluster to the co-channel transmitter site (associated with a particular path/side of interest), can be calculated with the values LATN, LONN, CLUS_LON, and CLUS_LAT which are provided in the microwave system database. AZDF represents the absolute value of the difference between (1) the azimuth (in degrees) from the incumbent transmitter site to the microcell cluster (i.e., the location of the SLMAs) and (2) AZIMUTHN (which represents the azimuth (in degrees) from the transmitter to the distant end of the duplex (point-to-point) incumbent radio link. With respect to the above-noted calculation of DIST and AZDF, reference is made to HART, T. M., "Great Circle Computations Using Lotus 1-2-3," *Ham Radio*, September, 1988, pp. 31 and 32, the content of which is expressly incorporated herein in its entirety.

AZDF is used to determine if a particular microcell cluster falls within the long portion of a keyhole (see FIG. 12) of a particular incumbent site. A determination of whether the microcell cluster falls within a keyhole is performed as follows: DIST is calculated to ensure that the distance between the microcell cluster and the fixed microwave site of interest is less than a threshold value MTLB (e.g., 20 miles), and AZDF is calculated to determine whether or not it is less than a threshold value MTLC (e.g., 10°). If these conditions are met, the microcell cluster is within the "long section" of the keyhole. For those incumbent radio paths where this first condition is not met, it is necessary to determine whether the microcell cluster is within the small back section ("core portion") of the keyhole. The microcell cluster is within the core portion of the keyhole, if DIST is less than a smaller distance threshold value MTLD (e.g., 3 miles in any direction).

If it is determined that the incumbent radio path is within the keyhole, in either of steps S38 and S39, MTL 56 will proceed to step S40 where the path and corresponding monitoring antenna data are stored in temporary data file B. This analysis is performed for each path data file until all path data files have been evaluated. When all such path data files have been evaluated as determined at step S41, the process performed by MTL 56 will proceed to step S42 (in FIG. 8B).

Figure 8A:
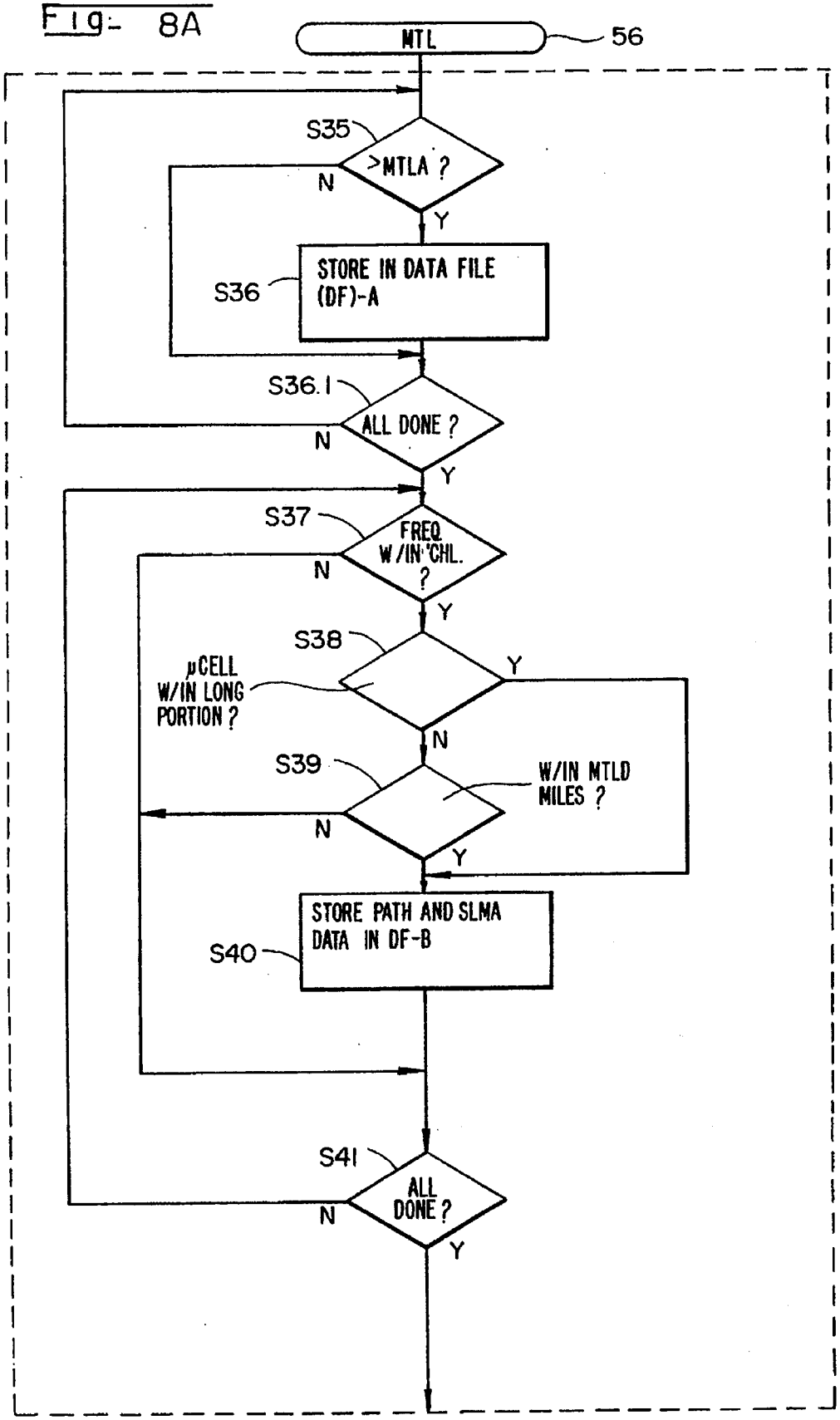
FIGS. 8A–8E collectively illustrate the operation of a Microwave Transmitter Locations module (MTL) 56.
Figure 8B:
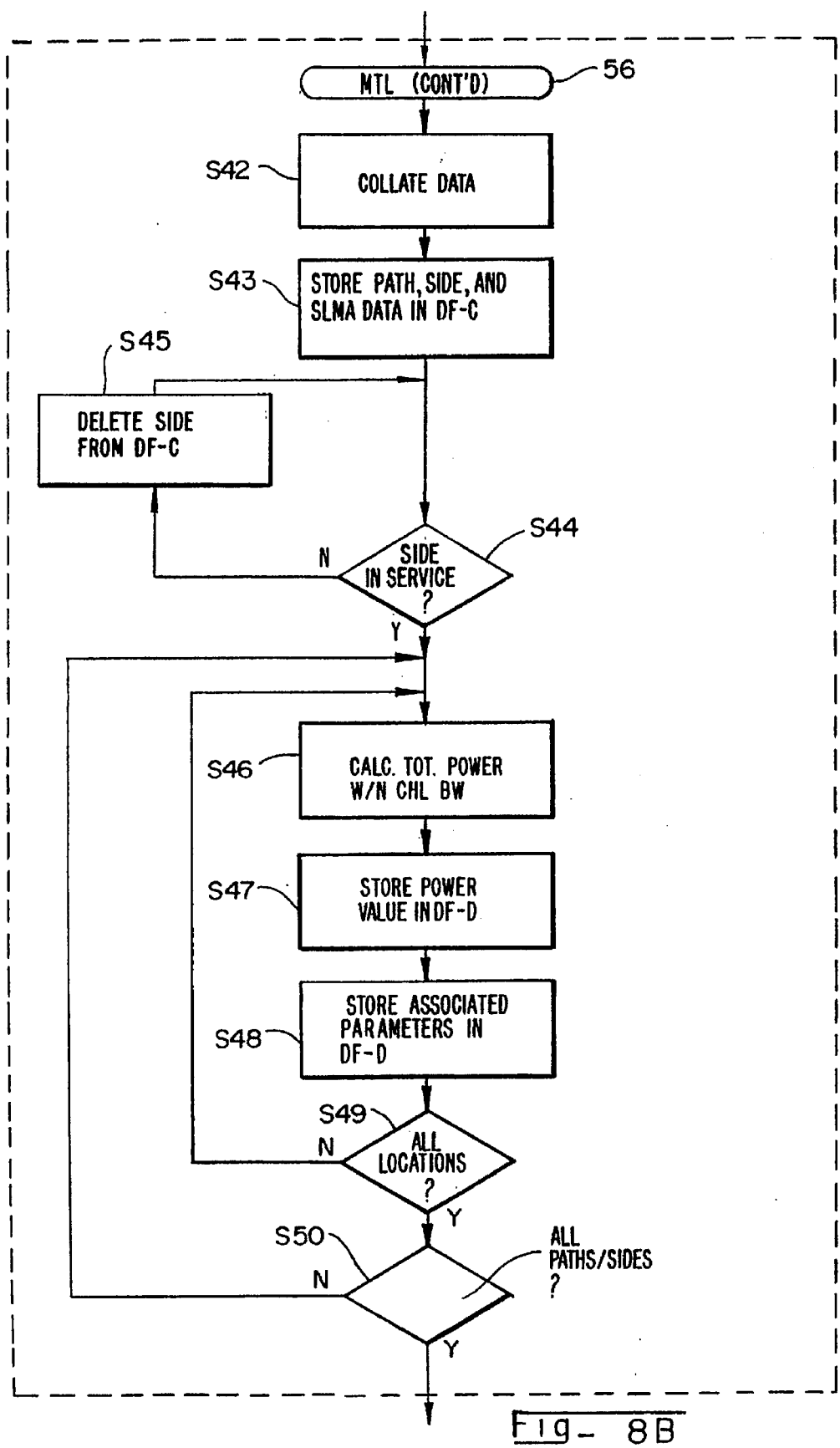

Referring now to FIG. 8B, in step S42, the data which is in temporary data file B is collated so that data for each side of each incumbent radio path appears together in other words, for data points meeting the criteria associated with steps S38 and S39, and having signal levels above a certain amplitude as determined in step S35, the data points are stored along with the corresponding SDB 34 file name for that path along with the associated side number, the lower frequency end of the microwave channel, the upper frequency end of the microwave channel, the path polarization (which is appended to FREQN in the SDB 34), the associated SLMA location number (1, 2, 3, . . . N), and an indication of whether the path was identified based on horizontal, vertical or both polarization measurements. In step S43, all of this data will be placed in a new file Temporary Data File C.

Each side of each path will be checked to see if it is still in service as indicated by the appropriate category in SDB 34. If any such path/side is found to be not in service, in step S45, it will be deleted from temporary data file C. This determination (step S44) will be repeated until each and every path/ side is evaluated. In step S46, a calculation is made for each path/side which remains listed in temporary data file C. For each such path/side the corresponding data file e.g., H1, H2, . . . , and V1, V2, . . . , will be evaluated to determine the total power within a particular microwave channel bandwidth. Accordingly, power values P(HN) associated with values HN will be determined, and values P(VN) associated with values VN will be determined. Thereafter, in steps S47 and S48, the total channel horizontal and vertical power values P(HN) and P(VN) for each SLMA location (1, 2, . . . N) and for each path/side listed in temporary data file C will be stored along with an associated path/side number, the associated SLMA location number, the path polarization, the lower frequency end of each microwave channel and the upper frequency end of the microwave channel in "temporary data file D." It is noted that the value of the path polarization will be referred to as POLN which is listed in category I of the microwave system data base 34.

At steps S49 and S50, determinations are made as to whether all locations and associated polarizations have been evaluated, and whether all path/sides have been evaluated, respectively. If all processing has been completed, as determined at steps S49-S50, MTL 56 will continue to step S51 which is illustrated in FIG. 8C.

Figure 8C:
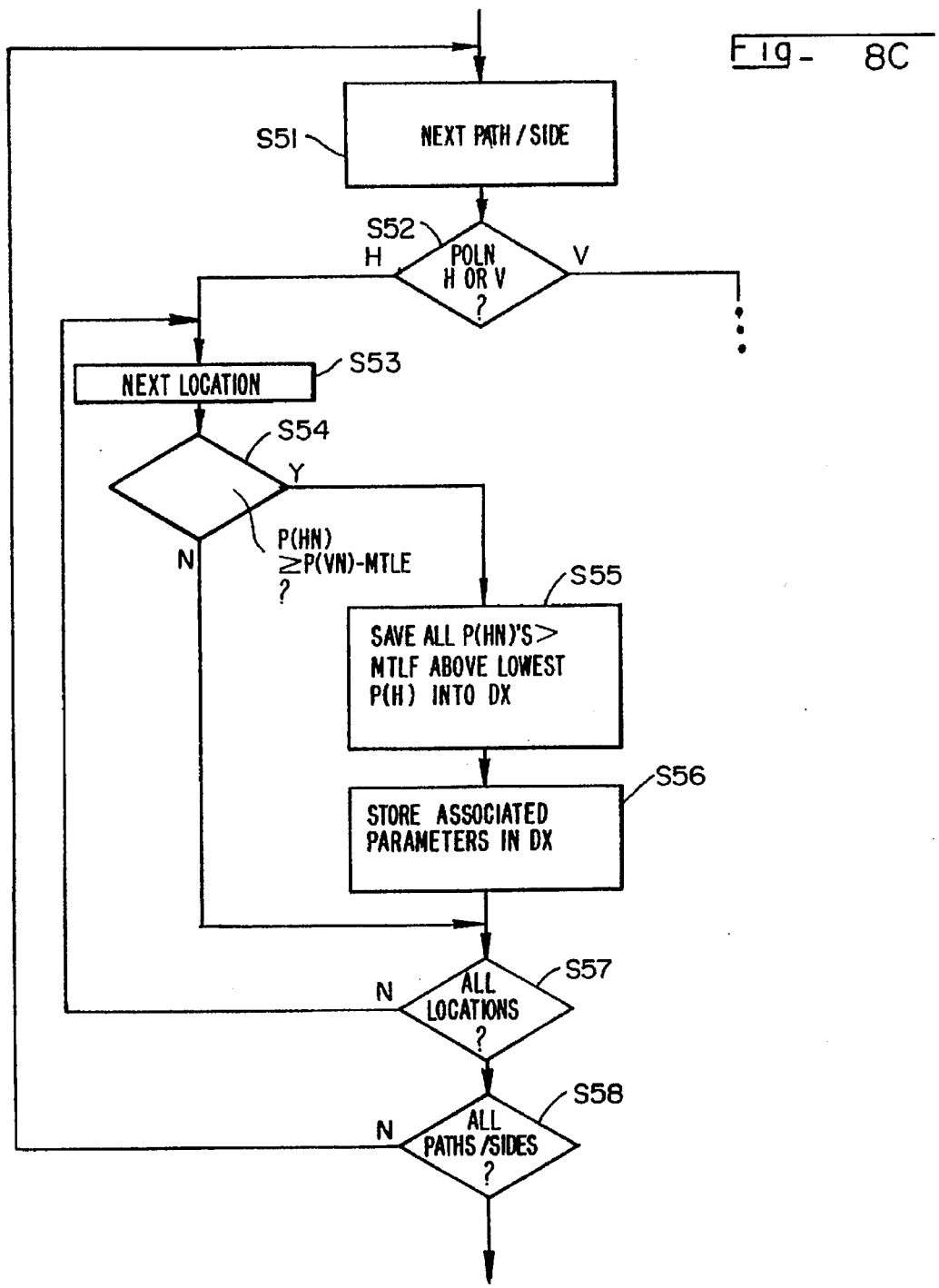

Referring to FIG. 8C, for each path/side which will be incremented at step S51, a number of steps will be performed (among steps S52-S58) which are depicted in FIG. 8C. A function is evaluated based on the total per-channel horizontal and vertical power values P(HN) and P(VN) for each SLMA location. If the co-polarized signal power value is less than the cross-polarized signal power value minus a threshold value MTLE (e.g., 6 dB) (i.e., $P_{co} < P_{cross} - MTLE$) the process will skip to the next path/side. If the co-polarized signal power value is the same or greater than the total of MTLE minus the cross-polarized signal power value, a comparison will be made to determine which of the co-polarized signal power values $P_{co}$ are the strongest.

The above-described processing is performed by the flow depicted in FIG. 8C. At step S52, a determination is made as to whether the polarization POLN is horizontal or vertical. If the polarization is horizontal, the process will proceed to step S53. The next location will evaluated at step S54, where a determination is made as to whether or not the horizontal polarization total power is greater than or equal to the vertical polarization total power minus the threshold value MTLE. If not, MTL 56 will proceed to step S57. If all locations have not been evaluated, step S53 will be repeated; if all locations have been evaluated, MTL 56 will proceed to step S58.

If P(HN) i.e., the total power associated with a particular horizontal polarization (at location N) is greater than or equal to the total of the vertical polarization total poker minus MTLE, all the $P_{co}$ (co-polarized power) values greater than a threshold amount MTLF above the lowest value Pco will be saved in a data file DX (see step S55). In step S56, other pertinent values, such as the AZN values, corresponding to the locations of the higher P values, the path/side number, the path polarization, the higher co-polarized signal power values, the associated SLMA location numbers, the lower frequency end oft he incumbent channel and the upper frequency end of %he incumbent channel, will be stored in temporary data file DX. It is noted that MTLF can be, e.g., 10 dB.

Similar processing is performed, if the polarization is determined at step S52 to be vertical. Since the processing is identical to the processing depicted in steps S53-S58, the steps corresponding thereto have not been shown in FIG. 8C.

Figure 8D:
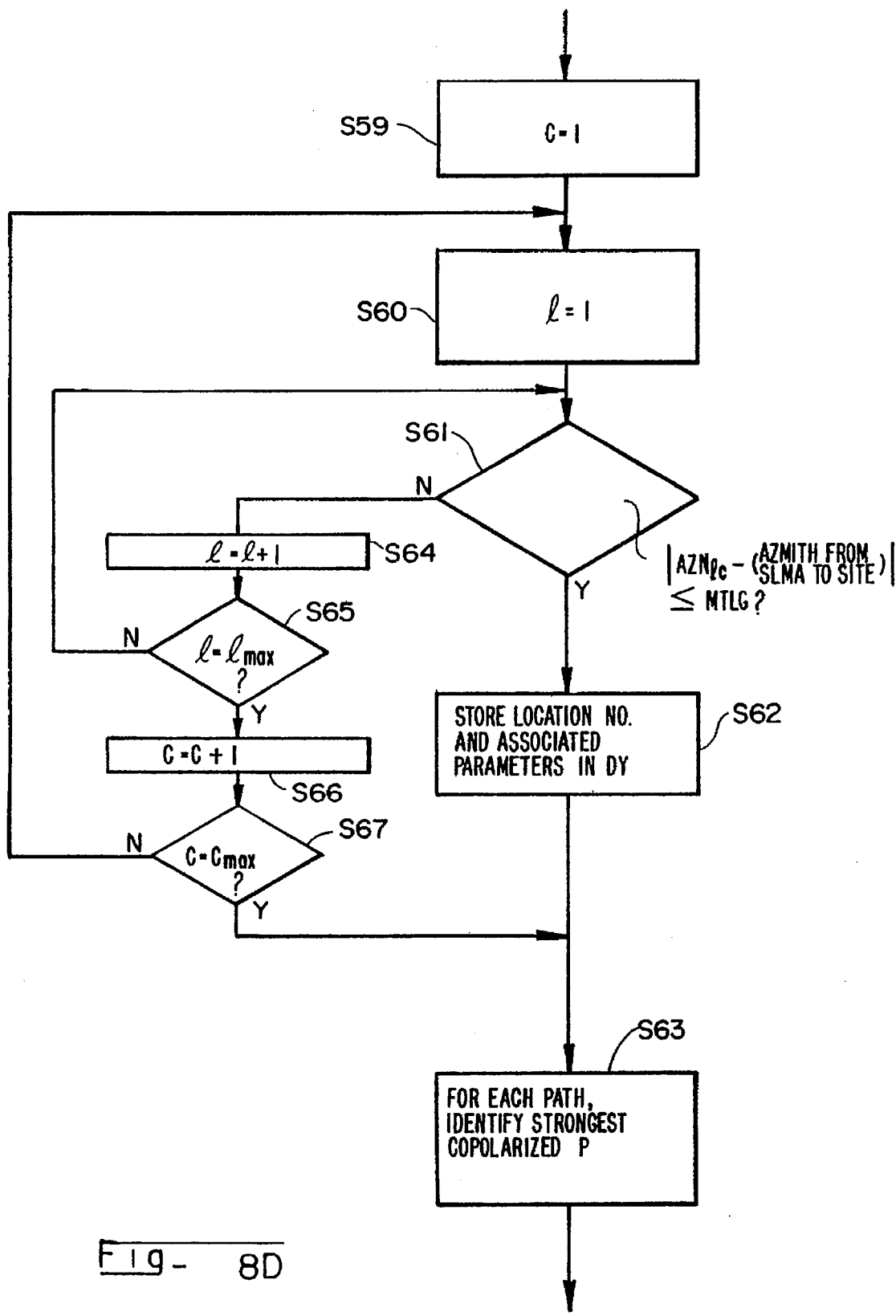

As shown in FIG. 8D, processing steps S61 and S62 are performed for each channel listed in temporary data file DX (in accordance with the index "c" defined in step S59, where c equals a number of channels), and for each location (in accordance with the index "1" defined in next step S60, where 1 equals a number of locations), as indicated by the operation of steps S59, S60, and S64-S67 collectively. Steps S64-S67 are conventional processing steps, and are thus not described in detail herein.

In step S61, the AZN values in temporary data file DX are evaluated. A determination is made as to which of the AZN values satisfy the relation (indicated in step S61) of $|AZN_{ic} - (aximuth from SLMA to site)| \leq MTLG$ (a threshold angular value (e.g., 60°)). The azimuth value is calculated by utilizing the values of LATN, LONN, CLUS_LON, and CLUS_LAT which are in SDB 34 associated with the path/side of interest. In this regard, reference is again made to the above-noted article by HART, T. M., pages 31-32. If the above-stated relation is true, as determined at step S61, the path/side number, the path polarization, the co-polarized signal power value $P_{co}$, the associated SLMA location, the lower end frequency of the channel and the upper end frequency of the channel are all stored in temporary data file DY (see step S62 in FIG. 8D).

In case AZ1 is "360" (thus implying that only one antenna has been used for the SLMA) for a particular path/side of interest, the path/side number will be stored along with the path polarization and the strongest signal power value which has contained for that path/side in temporary data file DX. Additionally, the lower end frequency of the incumbent radio channel and the upper end frequency of the incumbent radio channel will be stored in temporary data file DY.

In step S63, for each path/side, the strongest co-polarized total power value $P_{co}$ will be identified and appropriately marked in data file DY.

Figure 8E:
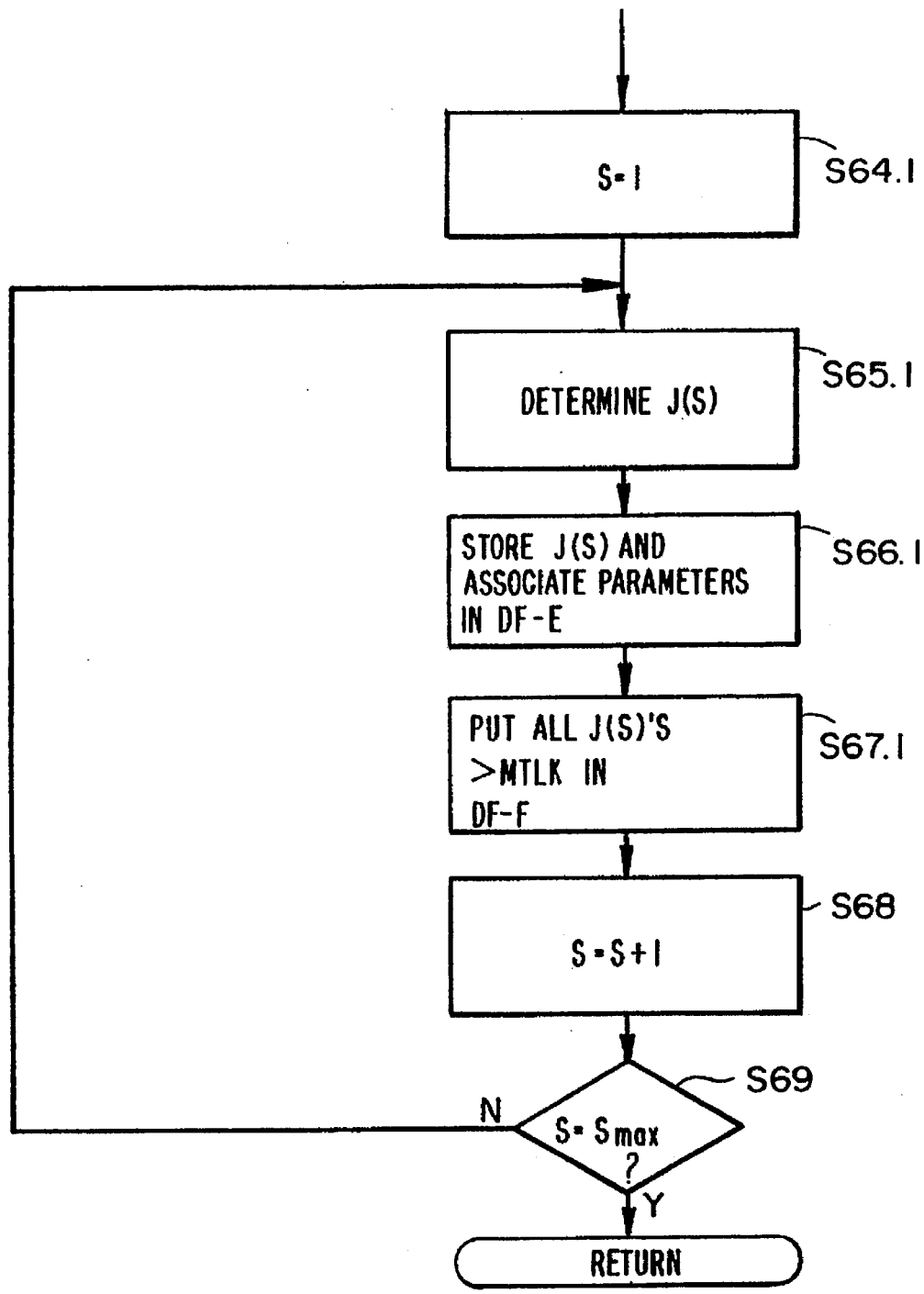

Referring to FIG. 8E, subsequent to execution of step S63, steps S65.1 through S68 will be performed for each path/side of interest ("s" being the number associated the path/side of interest), the indexing being performed in steps S64.1 and S69 collectively. In step S65.1, for each path/side listed in temporary data file DY, and for each of the strongest associated co-polarized signal power values $P_{co}$ from temporary data file DY, SDB 34 is accessed to facilitate calculation of a factor J( ), which is a function of P( ), LATN, LONN, AZIMUTHN, TX_GAINN, TX_CLN, POWERN, CLUSEL_FT, CLUS_LON, CLUS_LAT, MTLH, MTLI and MTLI. DIST and ASDF are calculated based on the values LATN, LONN, CLUS_LON, and CLUS_LAT, as well as based on the absolute value of the difference between the azimuth from the microwave transmitter to the microcell cluster of interest and AZIMUTHN, which is the azimuth from the transmitter to the distant end of the duplex link.

In addition, a variable ELDF is defined which represents the difference between TX_CLN and CLUSEL_FT, to thus find the absolute value in feet of the difference of height between the microwave transmitter antenna and the mean cluster height.

In view of the above, J is calculated for each path/side of interest as follows:

$$J = POWERN + TX\_GAINN - MTLH \log DIST - MTLI \log ELDF - MTLI \log(\sin(AZDF)) + P$$

In step S66.1, a list of J's is stored, each J value being stored along with each path/side and other parameters associated with each path/side in temporary data file E. In particular, at least the P( ) value will be stored for each path/side along with the J( ) values.

In step S67.1, all the J(s)'s which are greater than a threshold value MTLK will be designated and put in a temporary data file F. The retained path/side and associated J( ) and P( ) values for each microwave channel should be stored in temporary data file F. This file now contains a listing of the locations which are most likely to be transmitting the microwave signals received at the associated microcell cluster (at which the SLMA locations which are utilized to conduct the measurements are located). The calculated J( ) gives an indication of the likelihood that a particular path/side has contributed significantly to the strength of a given signal level value received by an SLMA 24.

Steps S68 and S69 comprise the additional steps needed to perform the necessary indexing so that the processing of steps S65.1 to S67.1 may be performed for each and every path/side of interest, as is customary in the art of programming. Once the processing is performed for every path/side of interest as determined as step S69, MTL 56 will return to Controller 42.

Figure 9:
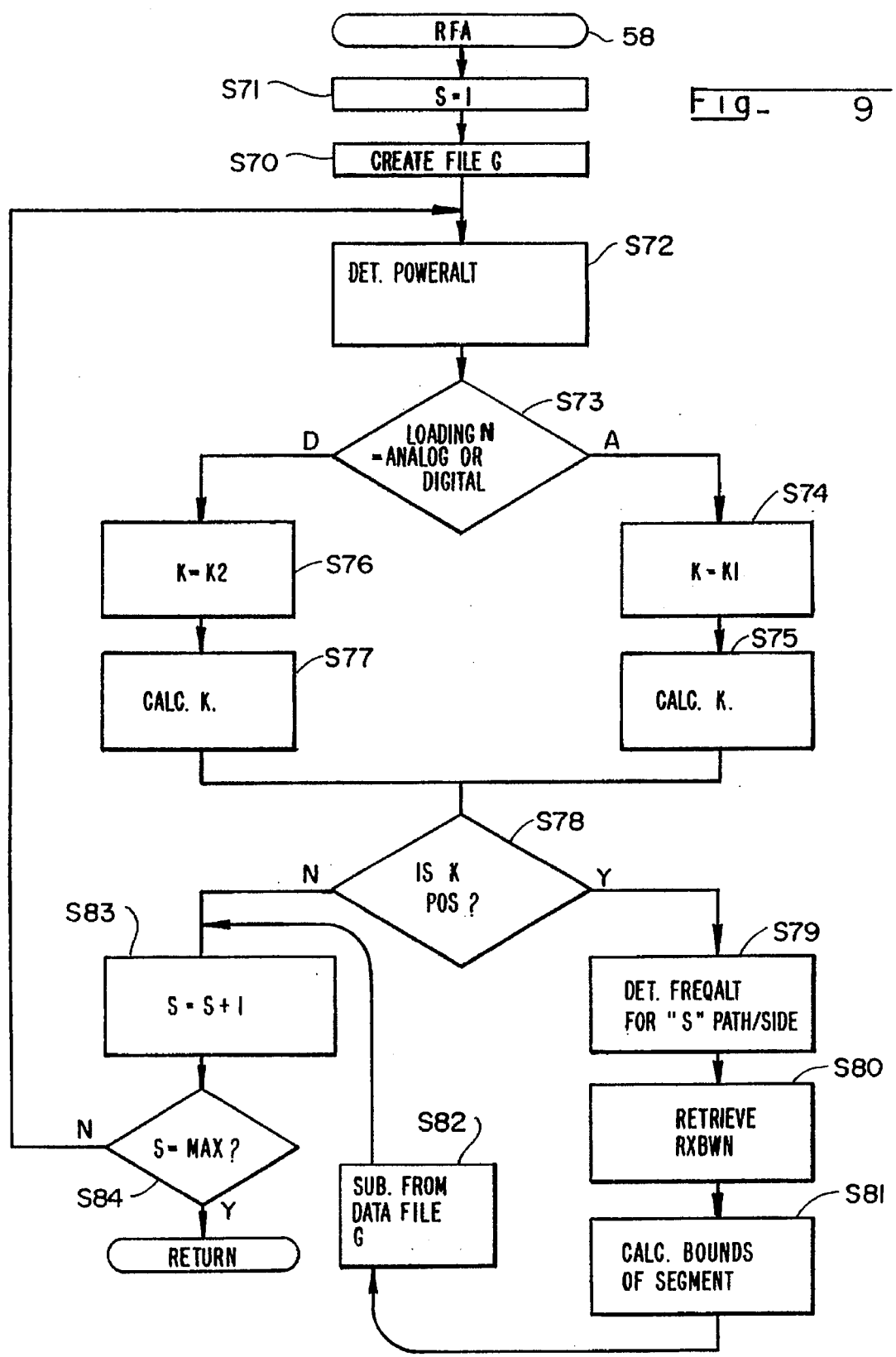
FIG. 9 illustrates the operation of a Receiver Frequency Availability module (RFA) 58.

Upon acquiring the above-described information which is stored in temporary data file F, Receiver Frequency Availability module (RFA) 58 will be executed, the flow diagram of which is depicted in FIG. 9. Once MTL 56 has identified which duplex microwave link sites and microwave channels likely have the least amount of RF isolation to a particular microcell cluster of interest, RFA module 58 accesses the SDB 34 to determine which nearby duplex receivers are particularly susceptible to interference (due to low RF isolation), and determines which duplex channels should not appear in the list of available channels to be assigned to MN 12 (FIG. 3) because of the potential for MN-to-incumbent system interference. Separate thresholds for analog and digital receivers may be employed to meet the requirements of EIA/TIA Telecommunications Systems Bulletin— Interference Criteria for Microwave Systems in the Private Radio Services—TSB 10-E, November 1990, and other interference coordination criteria. It is noted that-because of the potential for adjacent-channel interference from MN-to-incumbent system, additional spectrum on either side of a microwave channel should also be excluded from the available channels list. RFA module 58 will accordingly take these effects into account. Other factors taken into account by RFA module 58 include the path length (of the incumbent fixed point-to-point radio system), the distant site transmitter power and an indication of whether or not the nearby link receiver employs space diversity.

For each path/side (as indexed at step S71), in step S72, SDB 34 is accessed to determine a value of POWERALT which is equal tot he value POWERN associated with an alternate side of the duplex link of interest. For example, if the power of the transmitter of SIDE1 is POWER1, and the transmitter power of SIDE2 is POWER2, POWERALT of SIDE1 is equal to POWER2, and POWERALT for SIDE2 is equal to POWER1.

At step S70, a file G is created in which all of the available portions oft he spectrum which are possibly part of the available microwave channels list for use by the mobile communications network 12 will be placed. Subsequently, in later portions of RFA 58 and TFA 60, excluded or unavailable portions of this spectrum will be deleted from File G. In step S73, a determination is made as to whether the receiver associated with the path/side performs either analog or digital demodulation, that is, the variable LOADING is "analog" or "digital". Accordingly, depending on whether the incumbent radio system link is digital or analog, as determined at step S73, the appropriate processing will be performed either by steps S76 and S77 (for digital) or steps S74 and S75 (for analog). Steps S74–S77 indicate the calculation of a value K( ). If LOADING is digital, K is set equal to K2, the determination of which-is described below. If LOADING is analog, K is set equal to K1, the determination of which is described below.

In order to make the determination of K( ), the following variables are pertinent: P( ), POWERN, RX_GAIN, TX_GAINN, RX_CLN, TX_CLN, DVGAINN, POWERALT, DIST_MILES, LOADING, RXTHN, RXINTANA, RXINTDIG, PCNUSER, PCNTXPWR, RFAA, RFAB, and RFAC.

A variable ANTDF is utilized to represent the absolute value in feet of the difference in heights fort the incumbent system transmitter antenna and the associated receiver antenna, which is equivalent to |TX_CLN−RX_CLN|.

K1 is calculated as follows:

$$K1 = 10 \log PCNUSER + PCNTXPWR + RX\_GAINN - TX\_GAINN - POWERALT + 20 \log DIST\_MILES + RXTHN - POWERN + P + RXINTANA - [(RFAA)(DVGAINN)] + RFAB \log ANTDF - RFAC.$$

K2 is calculated as follows:

$$K2 = 10 \log PCNUSER + PCNTXPWR + RX\_GAINN - TX\_GAINN - POWERALT + 20 \log DIST\_MILES + RXTHN - POWERN + P + RXINTDIG - [(RFAA)(DVGAINN)] + RFAB \log ANTDF - RFAC.$$

A high or positive K value signifies that the microwave receiver interference is likely, and thus signifies a low RF isolation between the microcell cluster of interest and the nearby fixed incumbent receiver. Accordingly, a determination is made at step S78, as to whether K is positive. If so, RFA 58 proceeds to step S79 where a determination is made as to the alternate frequency (FREQALT) for path/side "s".

Thereafter, in step S80, the bandwidth RXBWN corresponding to the alternate frequency oft he receiver which is associated with a transmitter of interest is determined. Accordingly, in step S81, the bounds of the spectrum segment to be excluded from the available microwave channels list are calculated, and the segment is subtracted from data file G in step S82.

If K is 0 or negative, the microwave receiver associated with the particular transmitter of that path/side is determined to not likely be interfered with by the nearby microcell cluster. Accordingly, RFA 58 will proceed back to step S72, should the number of path/sides not be at its maximum as determined at step S84 (subsequent to incrementing s as shown in step S83).

It is noted that FREQALT is the value of FREQN associated with the alternate side of a particular path. Thus, if in temporary data file F refers to SIDE1 for a particular path, the value of FREQ 2 will be retrieved as FREQALT. If the data in temporary data file F refers to SIDE2 of a particular path, the value of FREQ 1 will be retrieved as FREQALT.

It is noted that the bounds of the spectrum segment, which are calculated in step S81, may be calculated as follows:

low end of segment=*FREQALT−RXBWN/2* high end of segment=*FREQALT+RXBWN/2*

Figure 10:
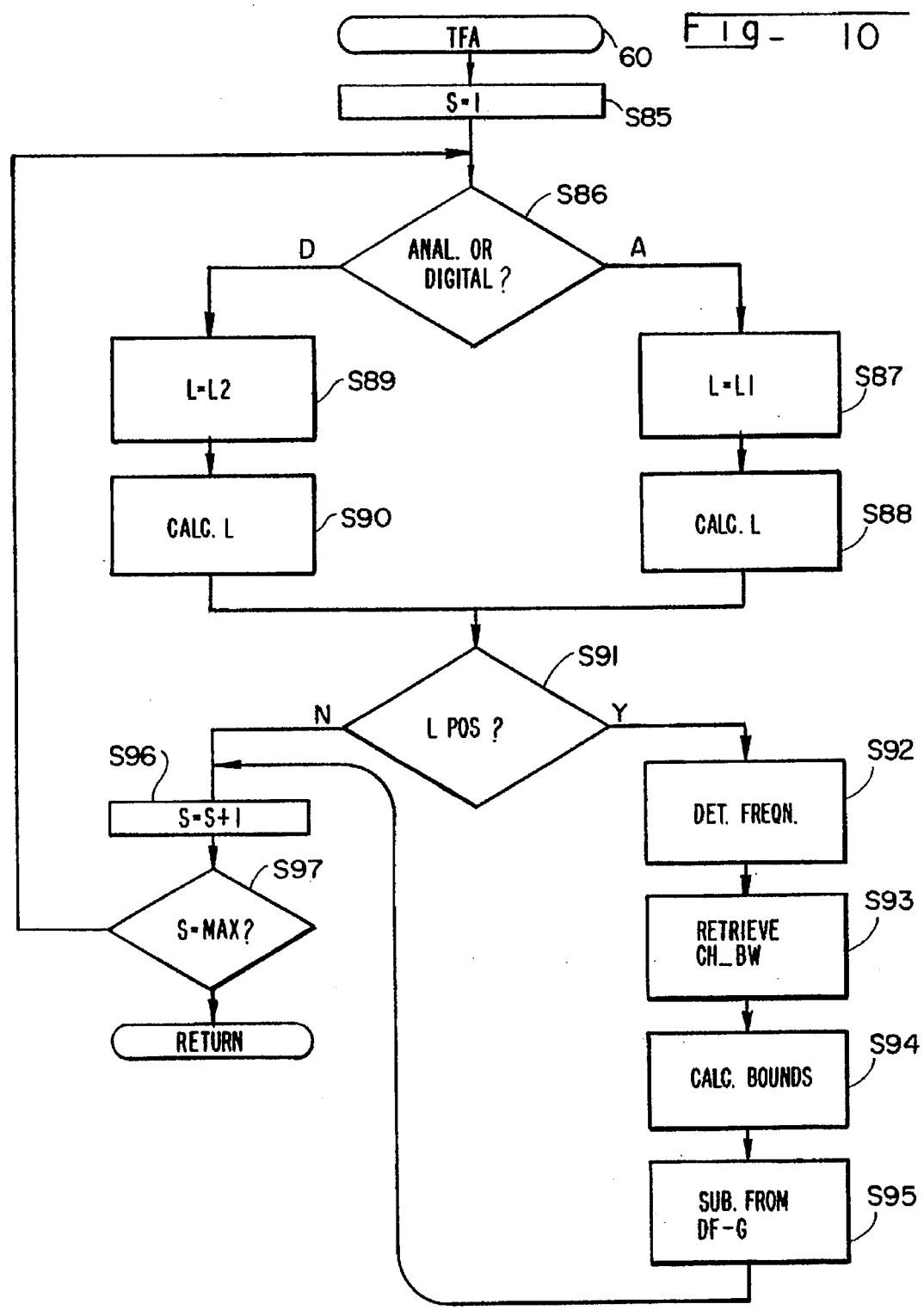
FIG. 10 illustrates the operation of a Transmitter Frequency Availability module (TFA) 60.

Transmitter Frequency Availability module (TFA) 60 is depicted in FIG. 10, and accesses SDB 34 to determine which additional channels should not appear in the available channels list because of a high potential for incumbent-to-MN interference (due to low RF isolation between the microcell cluster of interest and the nearby fixed transmitter).

For each path/side (s indicating the number of the path/side of interest and being initially set to "1" in step S85), in step S86, the variable LOADING is determined by accessing SDB 34, which is associated with the particular path/side of interest in temporary data file F. Upon determining LOADING in step S86, a determination is made in step S86 as to whether or not the variable indicates that "digital" modulation is performed or "analog" modulation is performed by that particular transmitter of interest. If the data is digital., steps S89 and S90 will be executed. If the modulation is analog, steps S87 and S88 will be executed.

In each of steps S89, S90, S87 and S88, L( ) is calculated in accordance with a particular equation depending on the type of data being used. In order to determine L( ), additional values RXINTPCN, TFAA, TFAB, TFAC, and also the values of P( ) which are stored in temporary data file F, will be determined by accessing the appropriate data files. L1, which is utilized if the particular path/side is "analog," is as follows:

L1=*P( )−TFAA−RXINTPCN−TFAC.*

L2, which is utilized to determine L( ) if the particular path/side modulation is "digital," is as follows:

L2=*P( )−TFAB−RXINTPCN−TFAC.*

If L is positive as determined at step S91, TFA 60 will proceed to step S92 where FREQN will be determined fort the "s" transmitter of interest. Thereafter, in step S93, the bandwidth CH_BW will be determined by accessing SDB 34. In step S94, the bounds of the spectrum segment to be excluded will be calculated, and in step S95 the excluded portions of the spectrum will be subtracted from data file G.

If L is not positive, thus indicating a low chance of incumbent-to-MN interference (and a high RF isolation), TFA 60 will proceed from step S91 directly to step S96 where S will be incremented, and if the maximum number of path/sides have been evaluated as determined at step S97, TFA 60 will return to where it was called. Otherwise, it will return to step S86 to make another determination.

It is noted that the limits in the segment of the spectrum to be excluded from the list of available spectrum are as follows:

low end of segment=*FREQN−CH_BW/2* high end of segment=*FREQN+CH_BW/2*

Figure 11A:
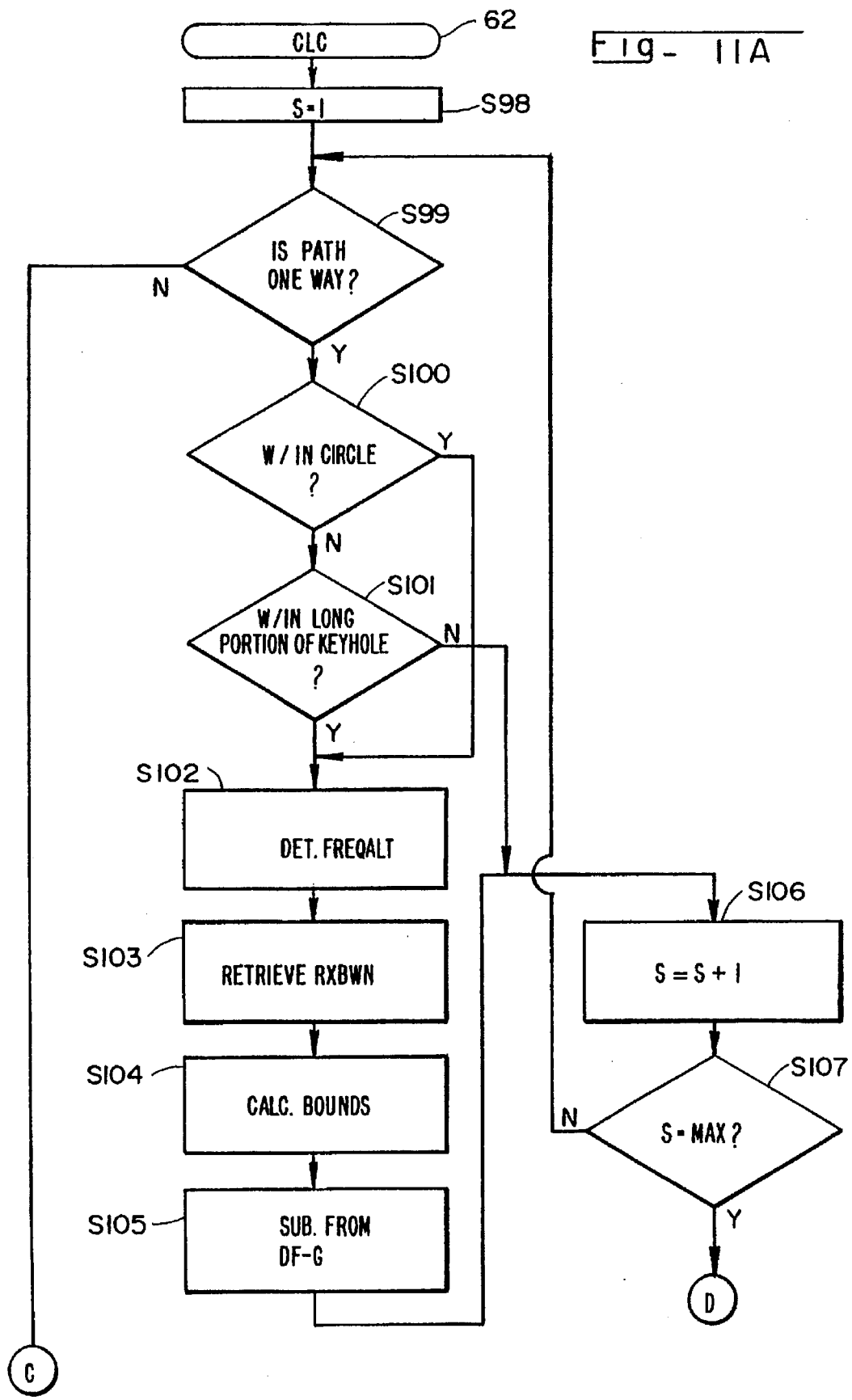
FIGS. 11A–11B illustrate the operation of a Channels List Conditioning module (CLC) 62.
Figure 11B:
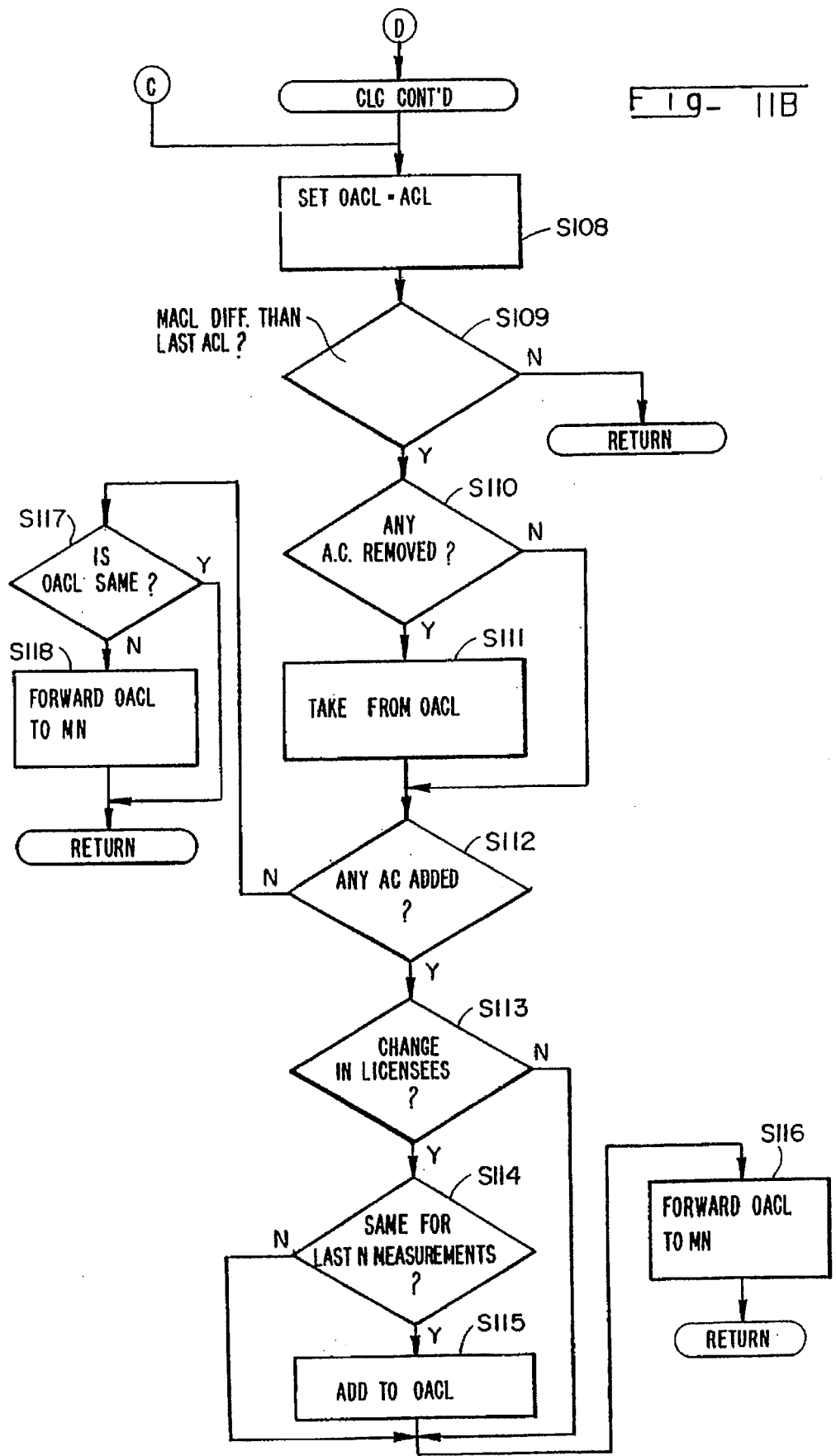

The operation of Channels List Conditioning module (CLC) 62 is depicted in the flow charts of FIGS. 11A–11B. Once RFA 58 and TFA 60 have determined which channel or channels should be excluded from the list of available channels (which is in data file G), CLC 62 determines whether the microcell cluster is located within any one-way receiver exclusion zones, and if so, what additional channels should be accordingly excluded. A one-way exclusion zone is defined in the present embodiment to be shaped like a "keyhole" having a specified radius (i.e., the length of the long portion 72; see FIG. 12) about the incumbent receiver location. The length of the long portion of the keyhole changes linearly with elevation, having a highest value (ONEWAYA miles) at RX_CLN feet elevation, and a minimum radius (ONEWAYB miles) at 0 feet elevation. The length of the long portion of the keyhole also changes linearly with elevation, as does the included angle of the longer portion. Referring to FIG. 12, a keyhole 69 includes a core portion 70 and a long portion 72. Keyhole 69 comprises a "one-way exclusion zone" defined for a one-way receiver. The radius of core portion 70 changes linearly with elevation, having a highest value of radius $R_A$ at an upper elevation, and a minimum radius $R_B$ at 0 feet elevation. The length of long portion 72 also changes linearly with elevation, as does the included angle $\theta$ of longer portion 72. The length of longer portion 72 of keyhole 69 is represented by a radius $R_C$ at a higher elevation, and a minimum radius $R_D$ at 0 feet elevation. The included angle ranges from an upper angle of $\theta_E$ to a lower angle at 0 feet elevation of $\theta_F$. The longer portion 72 is oriented toward the distant transmitter location of the particular path of interest.

For purposes of explaining the operation of CLC 62 below, the various parameters of key hole 69 depicted in FIG. 12 are represented as follows: ONEWAYA=$R_A$, at RX_CLN feet elevation; ONEWAYB=$R_B$, at 0 feet elevation; $R_C$=ONEWAYC, at RX_CLN feet elevation; $R_D$=ONEWAYD, at 0 feet elevation; the included angle $\theta_E$=ONEWAYE degrees at RX_CLN feet elevation; and $\theta_F$=ONEWAYF degrees at 0 feet elevation. In performing the calculations, CLC 62 will use the following values from SDB 34: LATN, LONN, AZIMUTHN, RX_CLN, CLUSEL_FT, CLUS_LON, CLUS_LAT, ONEWAYA, ONEWAYB, ONEWAYC, ONEWAYD, ONEWAYE, AND ONEWAYF. It is noted that, for each path/side, if CLUSEL_FT is greater than RX_CLN, the value of CLUSEL_FT/RX_CLN should be set to 1, for all calculations in which the value is used.

Referring again to FIG. 11A, at step S98, CLC 62 sets an index s, which is representative of the side/path of interest, to 1. In step S99, a determination is made as to whether the path is one-way. In such a case, the variable EQPCODN would be 999999 as indicated in the appropriate category of SDB 34. If the path is one-way, CLC 62 will continue forward; if not, however, CLC 62 will skip a number of steps, and proceed to step S108 (shown in FIG. 11B).

If the path is one-way, in step S100, a determination is made as to whether the microcell cluster is within a specified circle having a specified radius which is related to the length of core portion 70 of keyhole 69, which is specified by $$[(ONEWAYA-ONEWAYB)] [CLUSEL\_FT/RX\_CLN]+ONE\text{-}WAYB$$

If the radius of the circle, determined by the above equation, is greater than a distance DIST (equal to the distance from the microcell cluster to the receiver site of the incumbent radio system), the microcell cluster is determined to be within a portion of the excusion zone which corresponds to core portion 70 of the keyhole 69. Accordingly, CLC 62 will proceed from step S100 to step S102. However, if the radius determined by the above equation is less than the distance DIST at step S100; CLC 62 proceeds to step S101 to determine if the microcell is within the long portion of the keyhole.

In order to determine whether the cluster is within the longer portion of keyhole 69, a first determination is made as to whether the microcell cluster is within the included angle $\theta$. If it is found to be within the included angle, a further determination is made as to whether it is within the radius of longer portion 72 of keyhole 69.

AZDF is calculated, which is equal to the absolute value of the difference between AZIMUTHN and the azimuth from the fixed incumbent receiver location to the microcell cluster, and compared to the included angle of the keyhole. To determine if the microcell cluster is within the included angle, the values CLUSEL_FTN and RX_CLN are used to calculate one-half of the included angle, which is found by:

$$\frac{1}{2}[(ONEWAYC-ONEWAYD)] [CLUSEL\_FT/RX\_CLN]+ONE\text{-}WAYD].$$

Subsequently, the calculated value of AZDF is compared with the value of one half the included angle. If AZDF is greater than one half the included angle, the cluster is not within the exclusion zone. If the cluster is not within the exclusion zone, the testing procedure steps S100 and S101 will be repeated for each and every path/side of interest, until the maximum s is determined at S107. For each iteration, as specified in step S106, the value for s is incremented. If the maximum number for s has not been reached, step S107 will return CLC 62 to step S99.

Upon detecting that the microcell cluster is within the included angle, a further determination must be made as to whether the microcell cluster is within the radius of a larger circle circumscribed about the incumbent fixed receiver antenna location. By utilizing the values of LATN, LONN, CLUS_LON and CLUS_LAT which can be gathered from SDB 34, the distance from the microcell cluster tot he incumbent receiver site can be readily determined. The radius of the pertinent circle is found by $$[(ONEWAYE-ONEWAYF)] [CLUSEL\_FT/RX\_CLN]+ONE\text{-}WAYF.$$

If this radius, indicative of the radius of a large circle which corresponds to the length of long portion 72, is less than the distance DIST, the microcell cluster is not within the exclusion zone, thus completing the determination of step S101. If the radius of the larger circle is greater than the distance DIST, the microcell cluster is within the exclusion zone, and CLC 62 will then proceed to step S102 as indicated in FIG. 11A.

In step S102, SDB 34 is accessed to determine the value of FREQALT which is the value of FREQN associated with the alternate side of interest. If EQPCODN is 999999, and refers to side 1 for a particular path, the value FREQ2 will be FREQALT. If EQPCODN is 999999 for side 2 of a particular path, the value FREQ1 will be FREQALT.

In step S103, the bandwidth value RXBWN will be retrieved from SDB 34 corresponding to the appropriate path/side, and the limits of the segment of the spectrum to be excluded from the list of available channels will be determined in step S104 based on the following equations:

low end of segment=*FREQALT−RXBWN/2* high end of segment=*FREQALT+RXBWN/2*

In step S105 the remaining available channels list, which is stored in temporary data file G, will be modified.

The above-noted procedure will be repeated until such time as step S107 determines that the path/side index s has reached its maximum number, at which time CLC will proceed to step S108.

In step S108, the measured available channels list (MACL), which is indicated in temporary data file G, will be stored, and an additional "operational" available channels list (OACL) will be set equal to the most recently updated ACL. Subsequently in step S109, a determination is made as to whether MACL is different than the last updated ACL.

If the MACL is not different than the last updated ACL, CLC 62 will return, and no changes need to be made to the ACL. If MACL is different, at step S110 a determination is made as to whether any channels have been removed (i.e., the MACL does not include channels that are listed in the last updated ACL); and, if so, such channels will be removed from the OACL in step S111. If no channels have been removed, the process will proceed to step S112. In step S112, a determination is made as to whether any available channels have been added (i.e., if the MACL includes additional channels which are not listed in the last updated ACL). If so, a determination is made to verify that each added available channel can be relied upon in steps S113–S114. If no such additional channel has been added, as determined in step S112, CLC will proceed to step S117, where a determination will be made as to whether OACL is the same as the last updated ACL. If it is the same, CLC 62 will return; if the OACL is not the same as the last updated ACL, the OACL will be stored as the newly updated ACL, and forwarded to MN (mobile network) 12 in step S118, and CLC 62 will return after step S118.

Referring to steps S113–S116, in step S113, a determination is made as to whether any recent change has been bade to the status of FCC licensees in SDB 34. If no recent changes have been made, it is likely that the additional available microwave channel has been detected only due to maintenance or temporary disability of a particular transmitter, and does not accurately reflect that a corresponding receiver or co-located receiver is not operating and will not be interfered with. If there was a recent change in the status of licensees, a determination is made at step S114 as to whether the added available channels were detected by the overall available microwave channels determination system 28 during the last N measurement sequences as indicated by the MCHF of SDB 34. If so, since a long history has been established that this additional channel is available at step S115, the available channel will be added to the OACL. However, if such a history was not established as determined at step S114, CLC 62 will proceed directly to step S116. In step S116, the OACL will be forwarded to MN 12, and CLC 62 will subsequently return to where it was called.

Figure 13:
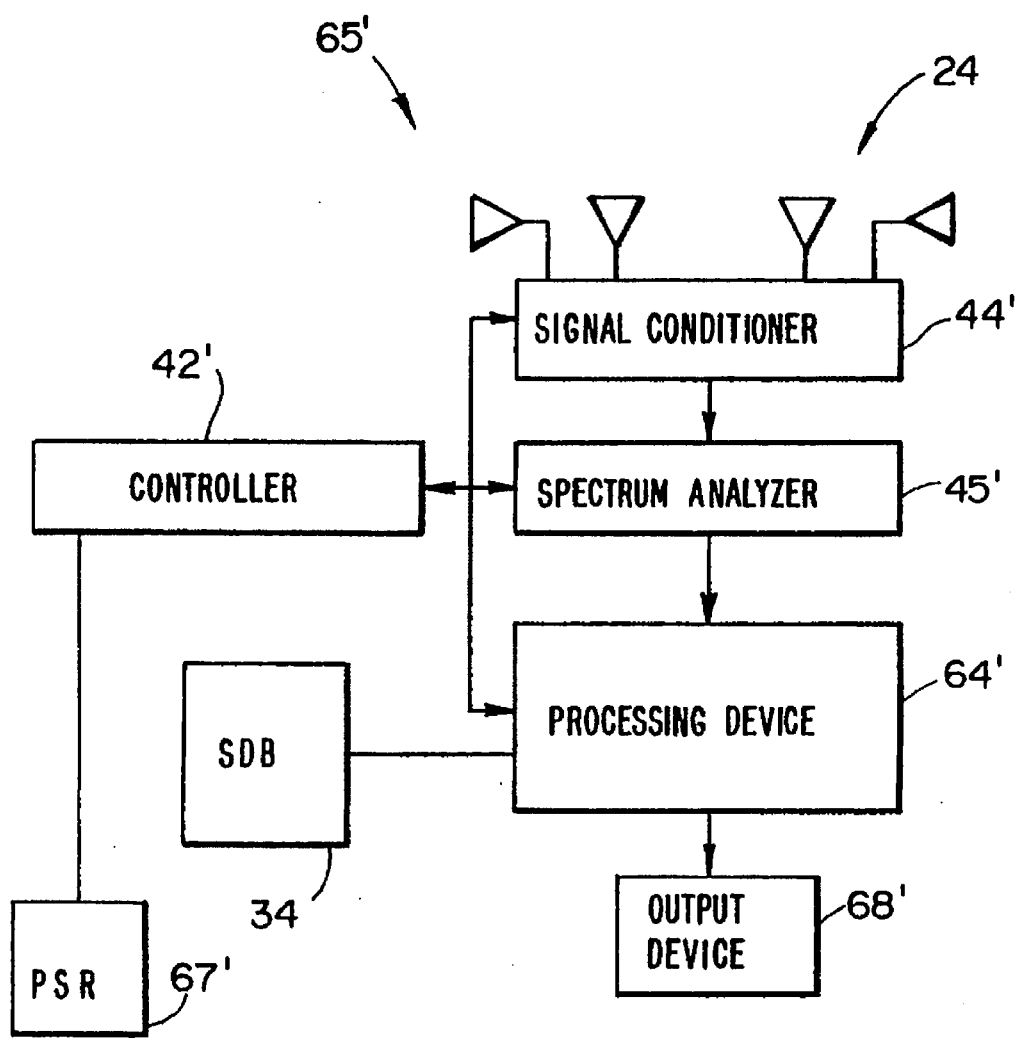
FIG. 13 illustrates a block diagram of a signal level monitoring system in accordance with a further embodiment of the present invention.

FIG. 13 illustrates a further embodiment of the present invention, in which a signal level monitoring system 65' is provided. Monitoring system 65' includes signal level monitoring antennas (SLMA's) 24, a signal conditioner 44', a spectrum analyzer 45', a controller 42', a processing device 64', and an output device 68'. Spectrum analyzer 45' and signal conditioner 44' may be configured substantially as described above with respect to the embodiment depicted in FIG. 3. Controller 42' is configured to control operation of signal conditioner 44', spectrum analyzer 45', and processing device 64'. Spectrum analyzer 45' produces data representative of signal levels contained within a plurality of separate frequency bands received by each of SLMA's 24. Processing device 64' processes data produced by spectrum analyzer 45' to produce data representative of a frequency and a degree of RF isolation between each SLMA 24 and a receiver of an incumbent radio system (not shown in FIG. 13). Output device 68', which may comprise, e.g., a data transmission device, a printer, or a display device, conforms the information provided by processing device 64' into a form readable by another device, or a human operator.

Processing device 64' may comprise, for example, SLM 48 and IDA 52, which are described above in detail with respect to the embodiment depicted in FIG. 3. In addition, SDB 34 may be provided, and connected to processing device 64', to provide information to SLM 48 and IDA 52 regarding incumbent radio system locations and specifications.

Signal level monitoring system 65' may be utilized, independent from any particular communication network or system, to monitor occupied frequency channels corresponding to one or more particular locations (at which SLMA's 24 are placed).

A positioning system receiver (PSR) 67' (e.g., a Global Positioning System receiver) may optionally be connected to controller 42' to detect the position of signal level monitoring system 65', and provide information indicating the same to controller 42'. The position-related information can accordingly be used by processing device 64' in determining the degree of RF isolation between SLMA's 24 and one or more receiver and/or transmitter antennas of a nearby radio communication system.

By way of example, signal level monitoring system 65' may be mounted to a mobile vehicle which can readily traverse large areas of terrain, to provide a complete picture of the available frequency spectrum in a given area. Signal level monitoring system 65' could be utilized to determine the likelihood that a nearby receiver will receive signals within a designated frequency band so that a radio system can either be configured to avoid transmission on that frequency band, or (if desired) to transmit on the designated frequency band. Signal level monitoring system 65, when used in a mobile vehicle, is particularly useful for deployment in areas in which there is a low density of incumbent radio system sites; in such an environment, frequent monitoring if incumbent radio systems (by a signal level monitoring device, to determine available segments of frequency spectrum) at fixed designated locations is not necessary.

FIG. 15 illustrates another embodiment of a spectrum sharing system which comprises a frequency allocation control system 30' and a mobile communications network (MN) 12'. MN 12' comprises a base station 18', within a microcell 14', and one or more user terminals 16'. A Portable Communications Switching Office (PCSO) 20' is coupled to base station 18', and includes a channel assignment device 21' which is connected to an MN I/F 100.

Frequency allocation control system 30' comprises an isolation determination system 102 which is coupled to MN I/F 100, and an input device 104.

Isolation determination system 102 performs needed calculations and determinations in order to estimate the RF isolation between incumbent receiver (and or transmitter) antennas 10' (which are located at one or more nearby sites 11 corresponding to an incumbent radio system) and a microcell 14' of MN 12' which shares a portion of the frequency spectrum in common with the incumbent radio system.

MN 12' may be configured in one or more of the manners described above with respect tot he first embodiment frequency allocation control system depicted in FIGS. 1 and 3. MN I/F 100 can include, e.g., nothing more than information (obtained from isolation determination system 102) being manually input into an operation terminal located at PCSO 20', or a permanently established communications link between PCSO 20' and isolation determination system 102, by which information can be transferred from isolation determination system 102 to PCSO 20 (via channel assignment device 21').

Isolation determination system 102 comprises a processing system for performing propagation analysis, in determining the degree of RF isolation between microcells 14' of MN 12' and incumbent radio system transmitters and/or receivers (not shown). The above-noted propagation analysis is performed with the aid of information input via input device 104 regarding frequency use (of the incumbent radio system and MN 12), geographic information (e.g., regarding the positioning of receivers and transmitters of each of MN 12' and the incumbent radio system, and the positioning of nearby objects (e.g., trees, buildings, etc.) which can affect the degree of RF isolation, and, optionally, signal measurement data which is indicative of the presence of one or more transmitters located within one or more frequency bands. By way of a non-limiting example, isolation determination system 102 can be configured to perform propagation analysis by determining the bounds of exclusions zones surrounding incumbent receiver and transmitter sites (within which a degree of RF isolation of an ancillary communications network, which transmits or receives signals in a common block of frequency spectrum, will be deemed below a minimum value). The exclusion zones are defined as a theoretically based safety zone within which interference may result between the incumbent radio system and the ancillary communications network (e.g., MN 12').

The exclusion zone or zones utilized by isolation determination system 102 can comprise one or more known or evolving models. For example, an exclusion zone may be used as defined in Motorola, Inc. "Comments Regarding PCN America Test Report, An Interim Report," Report to FCC Regarding GEN. Docket 90-314, Jul. 24, 1991 (e.g., at pages 2–3), the content of which is expressly incorporated by reference herein in its entirety.

A number of features can be provided which are related to the various embodiments disclosed herein, in order to gain specific benefits or avoid particular problems that may be encountered in implementing the same in one or more specific environments. Several examples of additional features which can be added to the herein described embodiments are described as follows.

With respect to the embodiments depicted in FIGS. 1 and 2, in order to reduce the need for separate signal level monitors 32 in separate areas, multiple sets of SLMA's (at various locations) can be connected to a single signal level monitor 32 via mass-produced remote down-converters (e.g., MMDS).

With respect to the exclusion zones which correspond to one-way links, these zones can be defined as a function of the transmission path physical characteristics, and are preferably defined in three dimensions. In determining the dimensions of these zones, the actual receiver bandwidth of the incumbent radio system receiver can be taken into account, and the zones can be defined to exclude channels which are adjacent to the receiver frequency band.

Channel assignment device 21, shown in FIG. 1, can comprise existing components of known cellular systems and protocols. For example, intra-cell hand-off, available with GSM systems, may be provided to change frequencies of microcell site radio base stations, and disclosed by Ericsson Radio Systems AB, "Cellular Mobile Telephone System CME 20 System Description," (1991), the content of which is expressly incorporated herein in its entirety.

Signal level monitor 32 (see, e.g., FIG. 3) may be provided with a device (not shown) for performing carrier-to-interference ratio analysis at large frequency offsets from the center of an incumbent radio channel, for analog incumbent links. By providing such a device, MN-generated interference can be compensated for as a function of the frequency offset from the center of the incumbent channel of interest.

A security device (not shown) may be provided to prevent unauthorized access to SDB 34, so that only authorized operators, and an authorized remote data base service vendor could provide updates to SDB 34.

For cases where a group of SLMA's, which are associated with a particular microcell cluster 13, receive signals from multiple incumbent radio system sites within a particular incumbent system channel, the composite signal level can vary with time. The composite signal level will likely vary also when incumbent system transmitters utilize automatic transmitter power control, for changing the transmitter output power during fading periods. Accordingly, it may be necessary to repeatedly make power level measurements for each incumbent radio system channel to improve the quality of the measurement values obtained by signal level monitor 32.

To mitigate effects of strong signals which appear outside of frequency bands being measured by signal level monitor 32 at any one time, signal level monitor 32 can be provided with a device (not shown) for gathering or evaluating out-of-band signals which are within the passband of band-pass filters of spectrum analyzer 45 (FIGS. 3 and 13), and compensate for the out-of-band signals by, e.g., adjusting internal attenuators or other signal level changing devices of spectrum analyzer 45 and/or signal conditioner 44.

MN 12 may utilize several conventional (or yet to be developed) narrowband communications network technologies, such as e.g., TDMA, CDMA, FDMA, or a hybrid combination of the above.

MN 12 may be provided with a mechanism for hopping between frequency bands which fall within the confines of the channels assigned by frequency assignment device 21, which may be dictated by the ACL defined by frequency allocation control system 30. By providing such a mechanism, the robustness of signal transmitted and received by MN 12 in the presence of interference from an incumbent radio system can be enhanced.

Although several spectrum sharing systems have been described above in detail with respect to several aspects of the present invention, the following general description is provided relating to the general overall operation of an example spectrum sharing system, to provide the reader with a better understanding of the context within which the present invention may be implemented.

In operation of the spectrum sharing system described herein, e.g., as depicted in, FIG. 1, user terminals 16 communicate with other user terminals or, e.g., other parties through the use of a telephone system connected to STN 22. For example, an individual may operate a handheld terminal 16 to make a call to another party via MN 12. In order to effect such communication to third parties, each terminal 16 will transmit and receive signals via a base station 18 which is associated with the microcell 14 within which user terminal 16 is located. An uplink (i.e., a communication path within which terminal 16 transmits information to base station 18) and a downlink (i.e., a communication path within which base station 18 transmits information to user terminal 16) are established, sot hat information can be exchanged between user terminal 16 and one or more third parties coupled to mobile communications network 12 (e.g., another user terminal, a base station of another microcell, or a telephone line coupled to STN 22).

User terminal 16 (which is typically mobile) may travel within a microcell 14, or pass from one microcell 14 to another. When a traveling user terminal 16 reaches a cell boundary, a handoff is initiated (which may be controlled by PCSO 20), in which user terminal 16 will be assigned a new base station 18 (associated with the new microcell 14) and a corresponding uplink and downlink.

Each uplink and downlink pair of MN 12 comprises transmitted radio signals within one or more frequency bands (for TDD, one band may be utilized, and for FDD, two bands may be utilized—one for the uplink and the other for the downlink), and, accordingly, occupy one or more portions of the frequency spectrum. Accordingly, the uplinks and downlinks of MN 12 may interfere with an incumbent radio system which uses a block of the frequency spectrum in common with MN 12, should any incumbent radio system sites (e.g., incumbent radio system site 11) be located nearby which utilize the same portions of the frequency spectrum and have a low RF isolation from one or more of the uplinks and downlinks of MN 12.

In order to address this problem, and avoid the likelihood of interference (MN-to-incumbent radio system, or incumbent radio system-to-MN) within the commonly occupied portions of the frequency spectrum, frequency allocation control system 30 will determine a list of available frequency channels (or portions thereof) which are not being utilized by incumbent radio system sites having low RF isolation from a nearby microcell 14, and provide the same to MN 12, so that MN 12 can assign frequencies for its uplinks and downlinks which are within the available channels list.

Information processor 36 (or e.g., isolation determination system 102) obtains the list of available channels (available channel list), which is provided to MN 12, by, e.g., evaluating the relative location of incumbent radio system sites that are near microcells 14 of MN 12 determining the ease with which RF signals can propagate from the incumbent radio system sites to the microcells 14 and vice versa. Such information regarding RF signal propagation may be obtained by measuring (via SLMA's 24).

While the invention has been described with reference to the described embodiments, it is understood that the words which have been used herein are words of description, rather than words of limitation. Changes may be made, within the purview of the appended claims, without departing from the scope and spirit of the invention in its aspects. Although the invention has been described herein in reference to particular means, materials and embodiments, it is understood that the invention is not to be limited to the particulars disclosed herein, and that the invention extends to all equivalent structures, methods, and uses, such as are within the scope of the appended claims.

TABLE 1

| DATA RECORD | MEANING |
|---|---|
| OWNER1 | Microwave Transmitter Licensee, Side 1 |
| SIC1 | SIC Code for Licensee, Side 1 |
| SITE1 | Transmitter Location Name, Side 1 |
| SITEST1 | Transmitter Location State, Side 1 |
| STATUS1 | FCC License Status, Side 1 |
| CALLSIGN1 | FCC Callsign, Side 1 |
| SERVICE1 | FCC Service - Operational Fixed |
| LAT1 | Site Latitude (D-M-S), Side 1 |
| LON1 | Site Longitude (D-M-S), Side I |
| AZIMUTH1 | Azimuth toward Receiver (degrees), Side 1 |
| TXANT_MAN1 | Transmitter Antenna Manufacturer, Side 1 |
| TXANT_MOD1 | Transmitter Antenna Model Number |
| TXANT_COD1 | FCC Code for Transmitter Antenna |
| TX_GAIN1 | Transmitter Antenna Gain (Db) |
| TX_CL1 | Transmitter Antenna Height (ft-AMSL) |
| RXANT_MAN1 | Receiver Antenna Manufacturer, Side 1 |
| RXANT_MOD1 | Receiver Antenna Model Number |
| RXANT_COD1 | FCC Code for Receiver Antenna |
| RX_GAIN1 | Receiver Antenna Gain (dB), |
| RX_CL1 | Receiver Antenna Height (ft-AMSL) |
| DVANT_MAN1 | Diversity Antenna Manufacturer, Side 1 |
| DVANT_MOD1 | Diversity Antenna Model Number |
| DVANT_COD1 | FCC Code for Diversity Antenna |
| DVGAIN1 | Diversity Antenna Gain (dB) |
| DVCL1 | Diversity Antenna Height (ft-AMSL) |
| EQPMAN1 | Transmitter Manufacturer, Side 1 |
| EQPMOD1 | Transmitter Model Number |
| EQPCOD1 | FCC Code for Transmitter |
| LOADING1 | Modulation - Analog or Digital |
| POWER1 | Transmitter Output Power (dBm) |
| FCCNO1 | FCC License File Number, Side 1 |
| APPDATE1 | Date Application Filed (M/D/Y) |
| GRTDATE1 | Date License Granted (M/D/Y) |
| PLAN1 | Frequency Plan - LL/HL/NS/L2/H2 |
| PREQI | Frequency (MHz) plus Polarization H/V |
| OWNER2 | Licensee (if Different from 1) |
| SIC2 | SIC Code forLicense, Side 2 |
| SITE2 | Transmitter Location Name, Side 2 |
| SITEST2 | Transmitter Location State, Side 2 |
| STATUS2 | FCC License Status, Side 2 |
| CALLSIGN2 | FCC Callsign, Side 2 |
| SERVICE2 | FCC Service - Operational Fixed |
| LAT2 | Site Latitude (D-M-S), Side 2 |
| LON2 | fite Longitude (D-M-S), Side 2 |
| AZIMUTH2 | Azimuth toward Receiver (degrees), Side 2 |
| TXANT_MAN2 | Transmitter Antenna Manufacturer, Side 2 |
| TXANT_MOD2 | Transmitter Antenna Model Number |
| TXANT_COD2 | FCC Code for Transmitter Antenna |
| TX_GAIN2 | Transmitter Antenna Gain (dB) |
| TX_CL2 | Transmitter Antenna Height (ft-AMSL) |
| RXANT_MAN2 | Receiver Antenna Manufacturer, Side 2 |
| RXANT_MOD2 | Receiver Antenna Model Number |
| RXANT_COD2 | FCC Code for Receiver Antenna |
| DVGAIN2 | Receiver Antenna Gain (dB) |
| DVCL2 | Receiver Antenna Height (ft-AMSL) |
| DVANT_MAN2 | Diversity Antenna Manufacturer, Side 2 |
| DVANT_MOD2 | Diversity Antenna Model Number |
| DVANT_COD2 | FCC Code for Diversity Antenna |
| DVGAIN2 | Diversity Antenna Gain (dB) |
| DVCL2 | Diversity Antenna Height (ft-AMSL) |
| EQPMAN2 | Transmitter Manufacturer, Side 2 |
| EQPMOD2 | Transmitter Model Number |
| EQPCOD2 | FCC Code for Transmitter |
| LOADING2 | Modulation - Analog or Digital |
| POWER2 | Transmitter Output Power (dBm) |
| FCCNO2 | FCC License File Number, Side 2 |
| APPDATE2 | Date Application Filed (M/D/Y) |
| GRTDATE2 | Date License Granted (M/D/Y) |

TABLE 1-continued

| DATA RECORD | MEANING |
|---|---|
| PLAN2 | Frequency Plan - LL/HL/NS/L2/H2 |
| FREQ2 | Frequency (MHz) plus Polarization - H/V |
| DIST_MILES | Path Length (Mi) |
| DIST_KM | Path Length (km) |
| CH_BW | Channel Bandwidth (MHz) |

NOTE:
The term "Side 1" refers to one end of the duplex link.
The term "Side 2" refers to the distant end of the duplex link.

TABLE 2

| DATA RECORD | MEANING |
|---|---|
| RXBW1 | Receiver IF Bandwidth (MHz), Side 1 |
| RXTH1 | Receiver-Threshold (dBm), Side 1 |
| RXBW2 | Receiver IF Bandwidth (MHz), Side 2 |
| RXTH2 | Receiver Threshold (dBm), Side 2 |
| RXANT_BW1 | Receiver Antenna Beamwidth (deg), Side 1 |
| TXANT_BW1 | Transmitter Antenna Beamwidth (deg), Side 1 |
| RXANT_BW2 | Receiver Antenna Beamwidth (deg), Side 2 |
| TXANT_BW2 | Transmitter Antenna Beamwidth (deg), 2 |

TABLE 3

| DATA RECORD | MEANING |
|---|---|
| CLUSEL_FT | Microcell Cluster Elevation (ft-AMSL) |
| CLUS_LON | Microcell Cluster Longitude (D-M-S) |
| CLUS_LAT | Microcell Cluster Latitude (D-M-S) |
| RXINTANA | Analog RX Interference Threshold (dB) |
| RXNITDIG | Digital RX Interference Threshold (dB) |
| RXINTPCN | PCN RX Intefrerence Threshold (dBm) |
| PCNUSER | PCN Users per Microwave Channel |
| PCNTXPWR | Average Power per PCN TX (dBm) |
| ONEWAYA | One Way Exclusion Zone Value A |
| ONEWAYB | One Way Exclusion Zone Value B |
| ONEWAYC | One Way Exclusion Zone Value C |
| ONEWAYD | One Way Exclusion Zone Value D |
| ONEWAYE | One Way Exclusion Zone Value E |
| ONEWAYF | One Way Exclusion Zone Value F |
| DATEMEAS | Date of Measurement (M/D/Y) |
| TIMEMEAS | Time of Measurement (HH:MM:SS) |
| AZ1 | Direction SLMA 1 Ants Face (deg) |
| AZ2 | Direction SLMA 2 Ants Face (deg) |
| AZ3 | Direction SLMA 3 Ants Face (deg) |
| AZ4 | Direction SLMA 4 Ants Face (deg) |
| MTLA | MTL Signal Threshold (dBm) |
| MTLB | MTL Length (mi) |
| NTLC | MTL Beamwidth (deg) |
| MTLD | NTL Radius (mi) |
| MTLE | MTL Polarization Offset (dB) |
| MTLF | MTL SLMA Location Offset (dB) |
| MTLG | MTL Azimuth Offset (deg) |
| MTLH | MTL Distance Factor |
| MTLI | MTL Elevation Factor |
| MTLJ | MTL Azimuth Factor |
| MTLK | MTL Summary Threshold |
| RFAA | RFA Diversity Gain Factor |
| RFAB | RFA Antenna Offset Factor |
| RFAC | RFA Summary Threshold |
| TFAA | TFA Analog Offset |
| TFAB | TFA Digital Offset |
| TFAC | TFA Summary Threshold |
| IDAA | IDA Threshold |

What is claimed is:
1. A mobile communuications network in which signals are transmitted and received between at least one base station and at least one user terminal over a common block of frequency spectrum that is shared with an incumbent radio system having a plurality of incumbent radio stations, said mobile communications network comprising:

means for periodically measuring signal levels of signals falling within a plurality of frequency segments of said common block of frequency spectrum, said measuring means comprising:

monitoring antennas, said monitoring antennas collectively having plural polarizations and being arranged to have spatial diversity;

a spectrum analyzer coupled to said monitoring antennas for producing data representative of a signal level contained within at least one frequency band received by each of said antennas;

means for controlling said spectrum analyzer; and means for processing information, including data produced by said spectrum analyzer, to produce data representative of a frequency of an incumbent receiver and a degree of RF isolation between at least one of said monitoring antennas and said incumbent receiver;

means for identifying which of said plurality of incumbent radio stations are nearby incumbent radio stations based on the signal levels measured by said measuring means;

means for calculating whether interference is likely to occur between said mobile communications network and at least one of the nearby incumbent radio stations identified by said identifying means;

means for periodically creating parameters, representative of the range of frequencies on which said user terminal transmits and receives said signals, based on a likelihood of interference calculated by said calculating means; and means for periodically assigning frequencies on which said user terminal transmits and receives said signals based on the parameters created by said creating means.

2. The mobile communications network according to claim 1, wherein said processing means comprises:

means for storing signal level data measured by each of said antennas, and for assigning one data record per antenna;

means for detecting bursts in said signal level data;

means for determining when abnormally high signal levels above a predetermined threshold value are measured;

means for re-measuring said signals, and adjusting said signal levels when a re-measurement of said signals results in a lower measured signal level which is below said predetermined threshold value;

means for integrating the signal level measured over a specified frequency range; and means for correcting the measured signal level data in accordance with calibration data.

3. The mobile communications network according to claim 1, wherein said processing means comprises a system database which comprises parameters of an incumbent radio system, said information which is processed by said information processing means further comprising said parameters.

4. The mobile communications network according to claim 1, wherein said measuring means further comprises: means for measuring a signal level within a discrete frequency range; means for collecting a plurality of measured signals levels within the discrete frequency range; and means for averaging the collected signal level values corresponding to the discrete frequency range.

5. The mobile communications network according to claim 1, wherein said measuring means comprises: means for determining if the measured levels of signals contain intermodulation products generated within said network; and means for subtracting intermodulation products from measured signal level data.

6. The mobile communications network according to claim 1, wherein said measuring means further comprises: means for taking plural measurements; and means for determining which of the measurements indicates a least amount of RF isolation between said mobile communications network and an incumbent radio system transmitter.

7. The mobile communications network according to claim 1, further comprising a positioning system for detecting the position of said measuring means.

8. The mobile communications network according to claim 1, further comprising:

means for comparing said signal level values with a predetermined threshold value;

means for identifying a transmitter of said incumbent radio system which corresponds to each signal level value which is determined to be above said threshold value;

means for identifying a receiver which is co-located with said transmitter; and means for determining the frequency at which said receiver receives signals.

9. The mobile communications network according to claim 1, wherein said monitoring antennas comprise directional antennas.

10. The mobile communications network according to claim 1, wherein said monitoring antennas comprise antennas collectively having both horizontal and vertical polarizations.

11. The mobile communications network according to claim 1, wherein said monitoring antennas comprise a steerable array of antennas.

12. The mobile communications network according to claim 1, wherein said identifying means comprises:

data storage means for storing information representing incumbent radio stations and the respective geographic locations of said incumbent radio stations; and means for determining which incumbent radio stations have a geographic location within a predetermined range of a signal measurement location and have a transmit or receipt frequency that is within a predetermined range of said frequency segment.

* * * * *